United States Patent
Guo et al.

(10) Patent No.: US 9,090,717 B2
(45) Date of Patent: Jul. 28, 2015

(54) UV CROSS-LINKING NEAT LUBRICANT MIXTURES FOR MAGNETIC RECORDING MEDIA

(75) Inventors: Xing-Cai Guo, Tracy, CA (US); Robert Waltman, Gilroy, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 416 days.

(21) Appl. No.: 13/330,339

(22) Filed: Dec. 19, 2011

(65) Prior Publication Data

US 2013/0157083 A1  Jun. 20, 2013

(51) Int. Cl.
| | |
|---|---|
| *B05D 5/12* | (2006.01) |
| *C08F 8/40* | (2006.01) |
| *G11B 5/725* | (2006.01) |
| *C10M 107/38* | (2006.01) |
| *G11B 5/00* | (2006.01) |
| *C08J 3/28* | (2006.01) |

(52) U.S. Cl.
CPC ............... *C08F 8/40* (2013.01); *C10M 107/38* (2013.01); *G11B 5/00* (2013.01); *G11B 5/725* (2013.01); *C08J 3/28* (2013.01); *C08J 2300/12* (2013.01)

(58) Field of Classification Search
CPC ............ C07C 43/13; G11B 5/00; G11B 5/72; G11B 5/725; C08J 3/28; C08J 2300/12; C08F 8/40; C10M 107/38
USPC .................................... 427/561, 131.561, 131
See application file for complete search history.

(56) References Cited

U.S. PATENT DOCUMENTS

| | | | |
|---|---|---|---|
| 4,859,299 A | 8/1989 | Kobayashi et al. | |
| 5,162,163 A | 11/1992 | Ohta et al. | |
| 6,299,946 B1 | 10/2001 | Toyoguchi et al. | |
| 6,846,542 B1 * | 1/2005 | Liu et al. | 428/64.2 |
| 6,878,398 B2 | 4/2005 | Itai et al. | |
| 6,916,510 B1 | 7/2005 | Liu et al. | |
| 7,018,681 B2 | 3/2006 | Liu et al. | |
| 7,252,897 B2 * | 8/2007 | Shimokawa et al. | 428/833 |
| 7,371,474 B1 | 5/2008 | Liu et al. | |
| 2001/0041773 A1 * | 11/2001 | Ruepping | 525/192 |
| 2005/0282045 A1 * | 12/2005 | Sonoda | 428/843.5 |
| 2008/0075854 A1 | 3/2008 | Stirniman et al. | |
| 2010/0002329 A1 * | 1/2010 | Hsia et al. | 360/55 |
| 2010/0021773 A1 * | 1/2010 | Reiter | 428/848 |
| 2010/0035083 A1 | 2/2010 | Yang et al. | |

FOREIGN PATENT DOCUMENTS

| | | |
|---|---|---|
| JP | 6234846 A | 8/1994 |
| JP | 2001143253 A | 5/2001 |

* cited by examiner

*Primary Examiner* — Michael Wieczorek
*Assistant Examiner* — Sarah R Anderson
(74) *Attorney, Agent, or Firm* — Kunzler Law Group, PC

(57) ABSTRACT

A method, system and apparatus are disclosed for forming a lubricant film for magnetic recording applications. The method includes, in certain embodiments, providing at least one substantially solvent free lubricant having a plurality of lubricant molecules with each lubricant molecule comprising a polymer chain having a backbone section and at least one functional end group. The method also includes treating the at least one substantially solvent free lubricant with a physical treatment to cross-link the backbone section of each polymer chain with at least one other molecule to create a cross-linked lubricant.

9 Claims, 18 Drawing Sheets

FIG. 1     (Prior Art)

| | $-O(CF_2O)_n-$ | $-O(CF_2CF_2O)_m-$ | $-O(CF_2CF_2CF_2O)_{l}-$ | $-O(CF_2CF_2CF_2CF_2O)_{l}-$ | $-CF_3$ | $M_n$ |
|---|---|---|---|---|---|---|
| Virgin Z1650 | 10.81 | 9.98 | 0.35 | | 1.50 | 2126 |
| UV Exposed (172nm/30m) Z1650 | 11.23 | 10.27 | 0.38 | 0.18 | 1.53 | 2194 |
| Virgin Z11080 | 44.90 | 32.26 | 1.34 | 0.68 | 1.25 | 7246 |
| UV Exposed (172nm/30m) Z11080 | 45.73 | 33.10 | 1.29 | 0.67 | 1.33 | 7381 |
| | $-O(CF_2O)_n-$ | $-O(CF_2CF_2O)_m-$ | $-O(CF_2CF_2CF_2O)_{l}-$ | $-O(CF_2CF_2CF_2CF_2O)_{l}-$ | $-CF_2CH_2OH$ | $M_n$ |
| Virgin Z-DOL 1820 | 8.02 | 7.84 | 0.05 | 0.02 | 2.00 | 1613 |
| UV Exposed (172nm/30m) Z-DOL 1500 | 9.52 | 9.32 | 0.05 | 0.03 | 2.00 | 1886 |
| | $-O(CF_2O)_n-$ | $-O(CF_2CF_2O)_m-$ | $-O(CF_2CF_2CF_2O)_{l}-$ | $-O(CF_2CF_2CF_2CF_2O)_{l}-$ | $-CF_2CH_2OH$ | $M_n$ |
| Virgin A20H 2020 | 9.94 | 10.12 | 0.10 | 0.05 | 0.99 | 2900 |
| UV Exposed (172nm/30m) A20H 2020 | 10.19 | 10.36 | 0.10 | 0.05 | 1.00 | 2941 |
| | $-O(CF_2O)_n-$ | $-O(CF_2CF_2O)_m-$ | $-O(CF_2CF_2CF_2O)_{l}-$ | $-O(CF_2CF_2CF_2CF_2O)_{l}-$ | $-CF_2CH_2OCH_2CH(OH)CH_2OH$ | $M_n$ |
| Virgin Z-TETRAOL | 10.74 | 9.81 | 0.06 | 0.03 | 1.90 | 2167 |
| UV Exposed (172nm/30m) Z-TETRAOL | 11.35 | 10.36 | 0.07 | 0.03 | 1.83 | 2267 |
| | $-CF_3$ | $-F$ | | | | |
| Virgin X-1P | 2.28 | 1.00 | | | | |
| UV Exposed (172nm/30m) X-1P | 2.26 | 1.00 | | | | |

FIG. 15

UV CROSS-LINKING NEAT LUBRICANT MIXTURES FOR MAGNETIC RECORDING MEDIA

FIELD

The subject matter disclosed herein relates to lubricant films for magnetic recording applications and more particularly relates to an apparatus, system, and method for forming a cross-linked lubricant film for magnetic recording applications.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a surface of magnetic material. A transducer head, e.g., read/write head, includes a writing component that magnetically polarizes areas of the magnetic material with one or two polarities to encode either binary zeros or ones. Thus, data is recorded as magnetically encoded areas or bits of magnetic polarity. A transducer head also includes a reading component that detects the magnetic polarity of each bit or area and generates an electrical signal that approximates the magnetic polarity. The signal is processed to recover the binary data recorded on the magnetic material.

As the disk rotates, air flow, or pressure, maintains the transducer head above the disk as the transducer head reads and writes information, and moves between information reading and writing positions. The triboligical interactions of the exterior surface of the disk with interfacing material, such as the head, as well as the triboligical interactions of the exterior surface of the disk with environment within the HDD, may result in loss of material from the protective layer of the disk. The process leading to loss of the material making up the protective layer is known as wear. Major types of wear include abrasion from the head contacting the protective layer of the disk, friction between the head and the protective layer of the disk, and corrosion of the protective layer. Wear can be minimized by proper selection of one or more lubricants for the lubricant layer.

It has become a challenge for a single type of lubricant to meet all the demanding requirements of magnetic recording media production and performance. A mixture of different types of lubricant has thus been developed. The problem with using a lubricant mixture is that the lubricants comprising the lubricant mixture may be immiscible leading to phase separation. One solution to the problem is to chemically combine the two or more lubricants into a single molecule. However, this reduces the ability of the lubricant to bond to the media as the number of functional groups in the combined lubricant is reduced. Another solution is to bond one or both types of the lubricant to each side of every disk. This incurs additional operational costs. What is needed is a method for using a wide selection of lubricant mixtures without weakening bonding of the lubricant to the disk or introducing operational costs.

BRIEF SUMMARY

Based on the foregoing discussion, the inventors have recognized a need for an apparatus, system, and method using a wide selection of lubricant mixtures without weakening bonding of the lubricant to the disk. Beneficially, such an apparatus, system, and method would not introduce additional operational costs.

The embodiments of the present invention have been developed in response to the present state of the art, and in particular, in response to the problems and needs in the art that have not yet been fully solved by currently available lubricant formulations. Accordingly, the embodiments have been developed to provide a method, apparatus, and system for cross-linking neat lubricant mixtures that overcome many or all of the above-discussed shortcomings in the art.

The method for forming a lubricant film for magnetic recording applications includes, in certain embodiments, providing at least one substantially solvent free lubricant having a plurality of lubricant molecules with each lubricant molecule comprising a polymer chain having a backbone section and at least one functional end group. The method also includes treating the at least one substantially solvent free lubricant with a physical treatment to cross-link the backbone section of each polymer chain with at least one other molecule to create a cross-linked lubricant.

In certain embodiments, the physical treatment includes a treatment selected from heating the at least one substantially solvent free lubricant, increasing pressure on the at least one substantially solvent free lubricant, changing the pH for the at least one substantially solvent free lubricant, irradiating the at least one substantially solvent free lubricant, and adding a catalyst to the at least one substantially solvent free lubricant. In one embodiment, irradiating the at least one substantially solvent free lubricant includes exposing the at least one substantially solvent free lubricant to a radiation source selected from an electron beam, gamma-radiation, and an ultraviolet light source. In an exemplary embodiment, the physical treatment includes exposing the at least one substantially solvent free lubricant to an ultraviolet light source. In such an embodiment, the ultraviolet light source has a wavelength selected from 185 nm and 172 nm. In certain embodiments, the method includes adjusting a distance between the ultraviolet light source and the at least one substantially solvent free lubricant to optimize cross-linking between the backbone section of each polymer chain and the at least one other molecule.

The method, in one embodiment, includes controlling an extent of cross-linking between the backbone section of each polymer chain and the at least one other molecule by monitoring an increase in viscosity of the at least one substantially solvent free lubricant. In such an embodiment, the at least one substantially solvent free lubricant may be treated with the physical treatment to increase the viscosity of the at least one substantially solvent free lubricant by at least about thirty-five percent.

In certain embodiments, the at least one substantially solvent free lubricant and the at least one other molecule each have a chemical structure that is substantially similar. In another embodiment, the at least one other molecule is a lubricant additive having an enhanced lubricating characteristic with respect to the at least one substantially solvent free lubricant. In an alternative embodiment, the at least one substantially solvent free lubricant is a lubricant having an enhanced lubricating characteristic with respect to the at least one other molecule. In either embodiment, the enhanced lubricating characteristic is a characteristic selected from an enhanced surface bonding characteristic and an enhanced tribological characteristic.

The substantially solvent free lubricant, in certain embodiments, includes a lubricant selected from Z-DOL, Z-TET- RAOL, ZTMD, and Demnum. The at least one other molecule includes a lubricant additive selected from X-1P and A20H.

In one embodiment, the method includes dissolving the cross-linked lubricant in a solvent and applying the cross-linked lubricant and the solvent to a surface of a magnetic recording medium. In such an embodiment, the method may also include evaporating the solvent from the cross-linked lubricant leaving the cross-linked lubricant on the surface of the magnetic recording medium.

A lubricant for lubricating a surface of a magnetic recording medium is also disclosed. The lubricant is substantially solvent free and includes a plurality of lubricant molecules. Each lubricant molecule includes a polymer chain having a backbone section and at least one functional end group. The backbone section of the polymer chain of the lubricant molecules are exposed to ultraviolet radiation to cross-link the backbone section of the polymer chain with at least one other molecule.

In one embodiment, the substantially solvent free lubricant includes a lubricant selected from Z-DOL, Z-TETRAOL, ZTMD, and Demnum. In another embodiment the at least one other molecule includes a second lubricant molecule from the plurality of lubricant molecules of the substantially solvent free lubricant. In such an embodiment, the backbone section of the lubricant molecule and the backbone section of the second lubricant molecule are cross-linked. In yet another embodiment, the at least one other molecule includes a lubricant additive. The lubricant may have at least one enhanced lubricating characteristic with respect to the lubricant additive. In such an embodiment, the at least one enhanced lubricating characteristic may be a characteristic selected from an enhanced surface bonding characteristic and an enhanced tribological characteristic.

In other embodiments, the at least one other molecule is a lubricant additive having at least on enhanced lubricating characteristic with respect to the substantially solvent free lubricant. In such an embodiment, the at least one enhanced lubricating characteristic is a characteristic selected from an enhanced surface bonding characteristic and an enhanced tribological characteristic. In certain embodiments, the at least one other molecule is a lubricant additive selected from X-1P and A20H.

A lubricated recording medium is also disclosed. The lubricated recording medium includes a substrate, a magnetic recording layer, an overcoat layer, and a lubricating layer. The substrate includes a rigid support structure for depositing a plurality of layers thereon. The magnetic recording layer is positioned between the substrate and the overcoat layer. The overcoat layer is a protective coating. The lubricating layer is positioned on the overcoat layer. The lubricating layer includes a lubricant compound developed from at least one substantially solvent free lubricant. The at least one substantially solvent free lubricant includes a plurality of lubricant molecules. The lubricant molecules each include a polymer chain having a backbone section and at least one functional end group. In forming the lubricating layer, the at least one substantially solvent free lubricant is exposed to ultraviolet radiation to cross-link the backbone section of each polymer chain with at least one other molecule to create a cross-linked lubricant.

In certain embodiments, the substantially solvent free lubricant includes a lubricant selected from Z-DOL, Z-TETRAOL, ZTMD, and Demnum. In one embodiment, the at least one other molecule includes a second lubricant molecule from the plurality of lubricant molecules of at least one substantially solvent free lubricant. In such an embodiment, the backbone section of the lubricant molecule and the backbone section of the second lubricant molecule are cross-linked.

In certain embodiments, the at least one other molecule is a lubricant additive. In such an embodiment, the at least one solvent free lubricant may have at least one enhanced lubricating characteristic with respect to the lubricant additive. The at least one enhanced lubricating characteristic includes a characteristic selected from an enhanced surface bonding characteristic and an enhanced tribological characteristic. In another embodiment, the at least one other molecule includes a lubricant additive having at least on enhanced lubricating characteristic with respect to the substantially solvent free lubricant. In such an embodiment, the at least one enhanced lubricating characteristic includes a characteristic selected from an enhanced surface bonding characteristic and an enhanced tribological characteristic. In either embodiment, the lubricant additive may be an additive selected from X-1P and A20H.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 15 depicts a chart showing nuclear magnetic resonance analysis of the components of various lubricants and lubricant additives before and after the lubricants and lubricant additives have been treated in their neat state with ultraviolet radiation at 172 nm for 30 minutes;

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

The schematic flowchart diagrams and/or schematic block diagrams may in some alternative implementations occur out of the order noted in the Figures. For example, two blocks shown in succession may, in fact, be executed substantially concurrently, or the blocks may sometimes be executed in the reverse order, depending upon the process involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the process flow of the depicted embodiment. For instance, an arrow may indicate a waiting period of unspecified duration between enumerated steps of the depicted embodiment.

HDDs are widely used to store digital data or electronic information for enterprise data processing systems, computer workstations, portable computing devices, digital audio players, digital video players, and the like. Generally, HDDs store data on a disk with a surface of magnetic material. A transducer head, e.g., read/write head, includes a writing component that magnetically polarizes areas of the magnetic material with one or two polarities to encode either binary zeros or ones. Thus, data is recorded as magnetically encoded areas or bits of magnetic polarity. A transducer head also includes a reading component that detects the magnetic polarity of each bit or area and generates an electrical signal that approximates the magnetic polarity. The signal is processed to recover the binary data recorded on the magnetic material.

Figure 1:
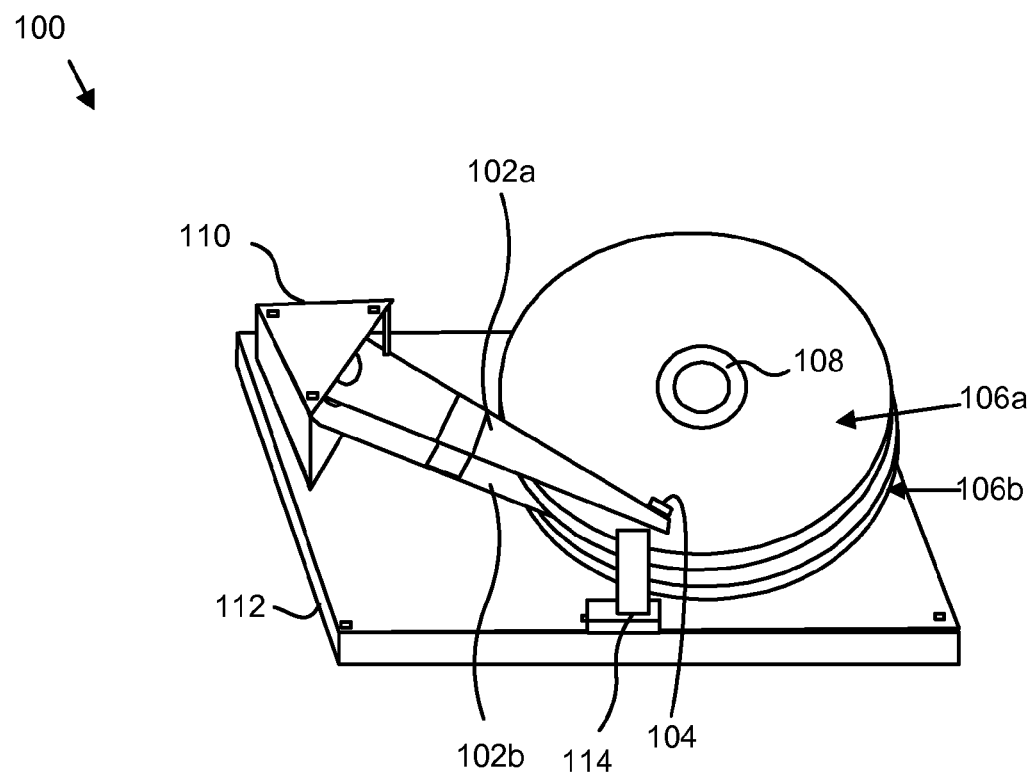
FIG. 1 is a perspective view of one embodiment of a conventional hard disk drive.
Figure 2:
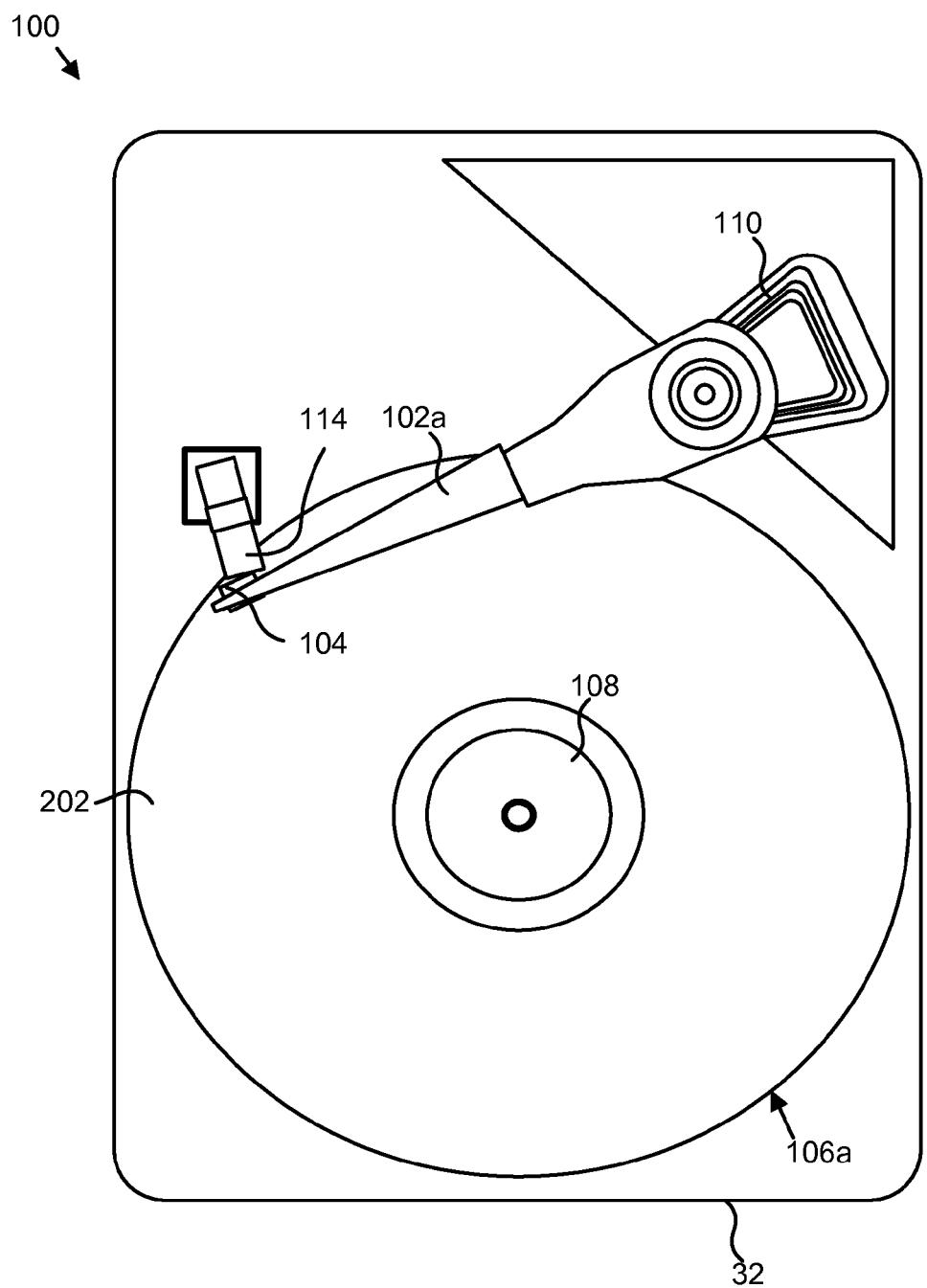
FIG. 2 is a top view of one embodiment of a conventional hard disk drive.

Referring to FIGS. 1 and 2, a conventional hard disk drive (HDD) 100 includes armatures 102a, 102b, transducer heads, such as transducer head 104, disks 106a, 106b, a spindle 108, a servo 110, a base 112, and a transducer head load/unload ramp 114. The HDD 100 can also include a cover (shown removed) that couples to the base 112 to form a housing. Each transducer head 104 is secured to an end portion of a respective armature 102a, 102b (the transducer head 104 attached to armature 102b is not shown). Although for simplicity the HDD 100 is described as having two armatures 102a, 102b, two transducer heads 104, two disks 106a, 106b, one spindle 108, and one servo 110, any number of armatures, heads, disks, spindles, and servos may be employed.

The spindle 108 is operably connected to the base 112. The disks 106a, 106b are operably connected to the spindle 108. The spindle 108 is further configured to rotate the disks 106a, 106b. The spindle 108 may be motivated by a motor as is well known to those skilled in the art. As the disks 106a, 106b rotate, the servo 110 positions the armatures 102a, 102b and the head 104 connected each armature 102a, 102b such that the heads 104 are positioned over a specified radial area of the disks 106a, 106b.

As will be described in further detail below, each disk 106a, 106b includes a magnetic material. In some embodiments, each disk 106a, 106b includes magnetic material on both sides of the disk 106a, 106b such that data can be stored on both sides of the disk 106a, 106b. Further, in these embodiments, the HDD 100 includes transducer heads 104 each positionable over a respective side of each disk 106a, 106b. The polarity of the magnetic material may be polarized by a magnetic field. As is known in the art, the transducer head 104 includes a write component (not shown) and a read component (not shown), which can be disposed collinearly on the head 104.

Generally, and in certain embodiments, the write component of each head 104 receives a write signal that encodes binary digital data via a conductive material that creates a magnetic field. In the case of transducer head 104, the spindle 108 rotates the disk 106a and the server 110 actuates the armature 102a to cooperatively position the transducer head 104 into a writing position above a designated portion, e.g., write track, of the disk 106a. The magnetic field of the conductive material on the transducer head 104 polarizes magnetic material on the disk 106a, as is well known to those skilled in the art, to write information to the disk 106a. Similarly, the read component of the transducer head 104 includes a thin film media that senses a magnetic field of an area of the disk 106a and generates a read signal corresponding to the polarity of the magnetic field as is well known to those skilled in the art. During a read operation, the spindle 108 rotates the disk 106a, and the server 110 actuates the armature 102a, in a manner similar to that described above in relation to the write operation to position a read component of the transducer head 104 into a read position above a designated portion, e.g., read track, of the disk 106a.

The transducer head 104 is configured to remain above the disk 106a during operation of the HDD 100. In other words, as the transducer head 104 writes information to and reads information from the disk 106a, the transducer head 104 moves between information writing and reading positions. While the transducer head 104 is moved between information writing and reading positions, the transducer head 104 remains a predefined distance, e.g., flying height FH (see FIG. 3), away from the spinning disk 106a. When the HDD 100 is not in operation, the transducer head 104 is positioned in a non-operational position on the ramp 114.

With some conventional HDDs, the ramp 114 is used to facilitate unloading of the transducer head 104 from an operational position above the disk 106a to the non-operational position on the ramp 114, and loading of the transducer head 104 from the non-operational position to an operation position above the disk 106a. As shown in FIG. 2, the ramp 114 is positioned proximate a side of the disk 106a with a portion of the ramp 114 at least partially over the disk.

As the disc 106 rotates, air flow or pressure maintains the transducer head 104 above the disk 106a as the transducer head 104 reads and writes information, and moves between information reading and writing positions. When transitioning from the non-operating state to the operating state, the disk 106a spins and the armature 102a is moved to send, e.g., load, the transducer head 104 down the ramp 114. As the transducer head 104 slides past the end of the ramp 114, the air flow created by the spinning disk 106a causes the transducer head 104 to fly above the disk 106a. When transitioning from the operating state to the non-operating state, the disk 106a remains spinning to keep the transducer head 104 flying and the armature 102a moves the transducer head 104 into contact with and up the ramp 114 to unload the transducer head 104 into the non-operational position.

The ramp 114 allows the transducer head 104 to transition between operating and non-operating positions without contacting an exterior surface 202 (FIG. 2) of the disk 106a. Without the ramp 114, the transducer head 104 may contact and slide along the disk 106a as the HDD 100 transitions between operation and non-operational states. Such contact is undesirable as it can result in damage to or the loss of data on the disk 106a.

Figure 3:
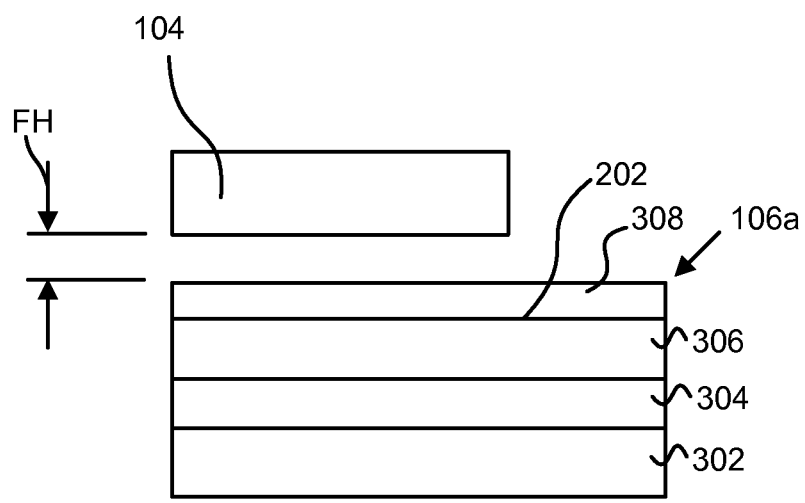
FIG. 3 is a schematic block diagram illustrating a cutaway view of one embodiment of a disk and transducer head for use in hard disk drive.

FIG. 3 depicts a side cutaway view of one embodiment of a disk 106a and transducer head 104 for use in the HDD 100. In certain embodiments, the disk 106a includes a substrate layer 302, a magnetic layer 304, and a protective layer 306 defining an exterior surface 202 of the disk 106a. The transducer head 104 moves, e.g., flies, over the exterior surface 202 of the disk 106a to perform read/write operations.

The substrate layer 302 can be made from any of various suitable materials known in the art, such as, but not limited to, metal, ceramic, glass and plastic. The magnetic layer 304 can be made from any of various suitable materials known in the art, such as, but not limited to, cobalt, chromium, platinum, ruthenium, and other similar materials. The material and composition of the magnetic layer 304 can depend on the type of recording to be used, e.g., longitudinal media recording or perpendicular media recording. The protective layer 306 can be made from any of various suitable materials known in the art, such as, but not limited to, a carbon mixture, such as carbon mixed with hydrogen and/or nitrogen, silicon carbide, silicon nitride, carbon nitride and/or silicon oxynitride.

As the transducer head 104 moves over the disk 106a, or as the disk 106a rotates under the transducer head 104, the transducer head 104 is spaced-apart a predetermined distance FH, i.e., flying height, relative to the disk 106a such that the transducer head 104 does not regularly contact the disk 106a. In certain embodiments, the FH is equal to the distance between the transducer head 104 and the lubricant layer 308.

The interactions of the exterior surface 202 of the disk 106a with interfacing material such as the head 104, as well as the triboligical interactions of the exterior surface 202 of the disk 106a with environment within the HDD 100, may result in loss of material from the protective layer 306 of the disk 106a. The process leading to loss of the material making up the protective layer 306 is known as wear. Major types of wear include abrasion from the head 104 contacting the protective layer 306 of the disk 106a, friction between the head 104 and the protective layer 306 of the disk 106a, and corrosion of the protective layer 306. Wear can be minimized by proper selection of one or more lubricants for the lubricant layer 308.

Under certain operational conditions, the transducer head 104 may contact and cause damage to the exterior surface 202 of the disk 106a. Accordingly, in an attempt to improved flyability and durability, and to reduce damage to the exterior surface 202 of the disk 106a due to contact between the transducer head 104 and the exterior surface 202 of the disk 106a, a layer of lubricant 308 is deposited on the protective layer 306 of the disk 106a between the protective layer 306 and the transducer head 104. Generally, the lubricant layer 308 is used to reduce friction between the transducer head 104 and exterior surface 202, as well as reduce surface wear on the exterior surface 202 of the disk 106a if and when the transducer head 104 contacts the exterior surface 202 of the disk 106a. In certain embodiments, the lubricant layer 308 also protects the exterior surface 202 of the disk 106a from atmospheric corrosion.

In selecting the lubricant(s) for the lubricant layer 308, at least two performance parameters may be taken into account. First, the lubricant(s) selected should exhibit superior surface bonding characteristics. That is, a particular lubricant or a combination of lubricants should readily bond with the exterior surface 202 of the disk 106a such that the lubricant layer 308 remains positioned on the exterior surface 202 of the disk 106a. Second, the lubricant or lubricant combination should also exhibit superior tribological characteristics. In certain embodiments, lubricants showing superior tribological properties include lubricants that do not exhibit phase separation, lubricants wherein the transducer head 104 does not readily pickup the lubricant, lubricants that exhibit low stiction/friction with the transducer head 104, and lubricants that protect the exterior surface 202 of the disk 106a from corrosion.

Another tribological characteristic found in a lubricant having superior tribological properties is the ability of the lubricant to replenish itself on areas on the exterior surface 202 of the disk 106a where the lubricant has been removed due to contact between the transducer head 104 and the exterior surface 202 of the disk 106a. That is, when the lubricant layer 308 is disrupted by contact with the transducer head 104 and lubricant is removed from a particular area on the exterior surface 202 of the disk 106a, the lubricant or combination of lubricants should readily move to the location where the lubricant was removed.

In certain embodiments, the lubricant layer 308 may include a perfluoropolyethers (PFPE) lubricant. PFPE's have a low surface tension and can be easily spread across the exterior surface 202 of the disk 106a. PFPE's are hydrophobic and repel water and have a strong bonding characteristic with carbon and therefore readily bond with the exterior surface 202 of the disk 106a. Additionally, PFPE's do not readily degrade, have a low vapor pressure, are thermally and chemically stable and are non-toxic and non-flammable. Examples of PFPE's include Fomblin Z, Fomblin Y, DuPont Krytox, and Demnum.

Figure 4A:
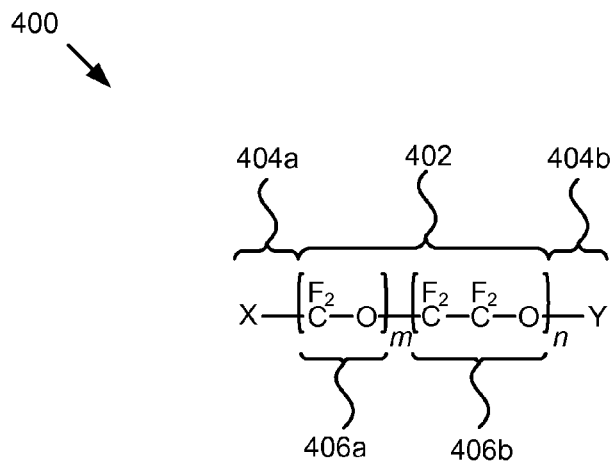
FIG. 4A illustrates one embodiment of a chemical backbone structure of a Fomblin Z molecule.

FIG. 4a depicts one embodiment of a PFPE molecule 400 based on the Fomblin Z structure. The Fomblin Z PFPE molecule 400 is a linear, random copolymer of perfluoromethylene-oxide 406a and perfluoroethylene-oxide 406b which make up the backbone 402 of the PFPE molecule 400. Functional end groups X 404a and Y 404b vary depending on the specific molecule and provide differing bonding and tribological characteristics to the lubricant as further discussed below.

In certain embodiments, the Fomblin Z PFPE molecule 400 may be altered by altering the number of perfluoromethylene-oxide 406a (m) polymer sections and the number of perfluoroethylene-oxide 406b (n) polymer sections in the backbone 402 of the PFPE molecule 400. Changing the molecular weight by, for example, changing the number of perfluoromethylene-oxide 406a (m) polymer sections and the number of perfluoroethylene-oxide 406b (n) polymer sections in the backbone 402 of the PFPE molecule 400 changes the chemical and mechanical properties of the lubricant. For example, molecules 400 with a high molecular weight show increased stiction problems with the head 104 and a decreased vapor pressure while molecules 400 with a lower molecular weight exhibit an increase in mobility but also exhibit an increase in vapor pressure which may cause the lubricant to evaporate from the exterior surface 202 of the disk 106a.

The surface bonding characteristics of the Fomblin Z PFPE molecule 400 depend, in part, on dispersive adhesion and van der Waals forces between the atoms of the backbone 402 of the PFPE molecule 400 and the atoms that make up the exterior surface 202 of the disk 106a. The bonding characteristics of the Fomblin Z PFPE molecule 400 are enhanced by polar interactions between Fomblin Z PFPE molecules 400 having end-groups 404 which include an OH and the exterior surface 202 of the disk 106a. Fomblin Z PFPE molecules 400 with OH end groups 404 interact with polar sites on the exterior surface 202 of the disk 106a to form hydrogen bonds and strong acid-base bonds. Accordingly, PFPE molecules 400 having OH end groups 404 have enhanced surface bonding characteristics in relation to PFPE molecules 400 that lack such OH end groups 404.

Figure 4B:
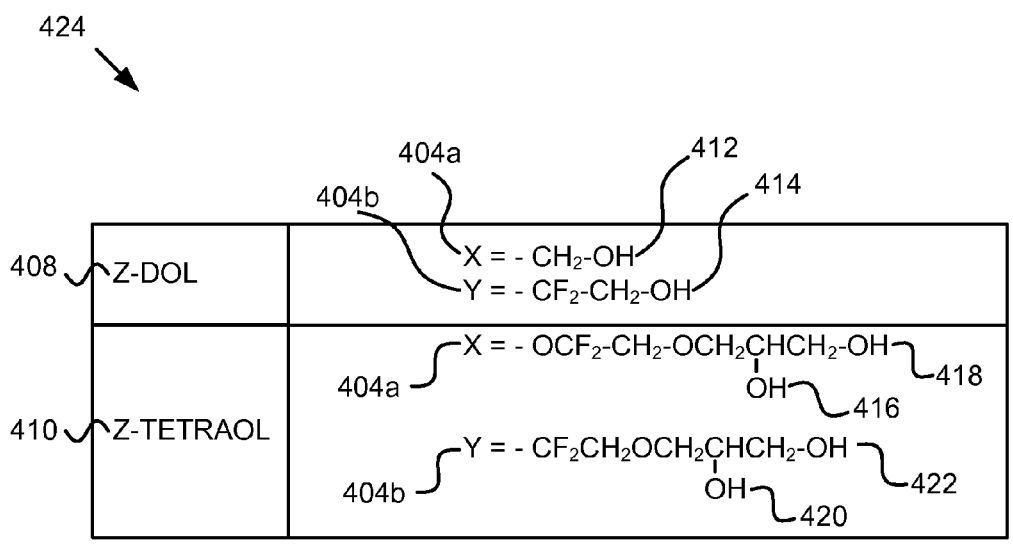
FIG. 4B is a chart illustrating one embodiment of a chemical structure of the end groups for Z-DOL and Z-TETRAOL.

FIG. 4B is a chart 424 illustrating one embodiment of the end groups 404 of PFPE molecules Z-DOL 408 and Z-TETRAOL 410. As can be seen, the Z-DOL molecule 408 includes a single OH group 412 at the X end group 404a and a single OH group 414 at the Y end group 414 of the Fomblin Z PFPE molecule 400. The Z-TETRAOL molecule 410, on the other hand, includes two OH groups 416 and 418 at the X end group 404a and two OH groups 420 and 422 at the Y end group 404b of the Fomblin Z PFPE molecule 400. The Z-TETRAOL molecule 410, having two OH groups at the X end group 404a and two OH groups at the Y end group 404b has an enhanced surface bonding characteristic than the Z-DOL molecule 408. On the other hand, the Z-DOL molecule 408, being less bonded to the exterior surface 202 of the disk 106a, can move across the exterior surface 202 of the disk 106a more readily than the Z-TETRAOL molecule 410. Accordingly, the Z-DOL molecule 408 has an enhanced tribological characteristic than the Z-TETRAOL molecule 410, namely an enhanced replenishment characteristic. That is, a lubricant layer 308 comprising Z-DOL molecules 408 can more readily replenish areas of the exterior surface 202 of the disk 106a where the lubricant has been removed due to contact between the transducer head 104 and the exterior surface 202 of the disk 106a.

Figure 5:
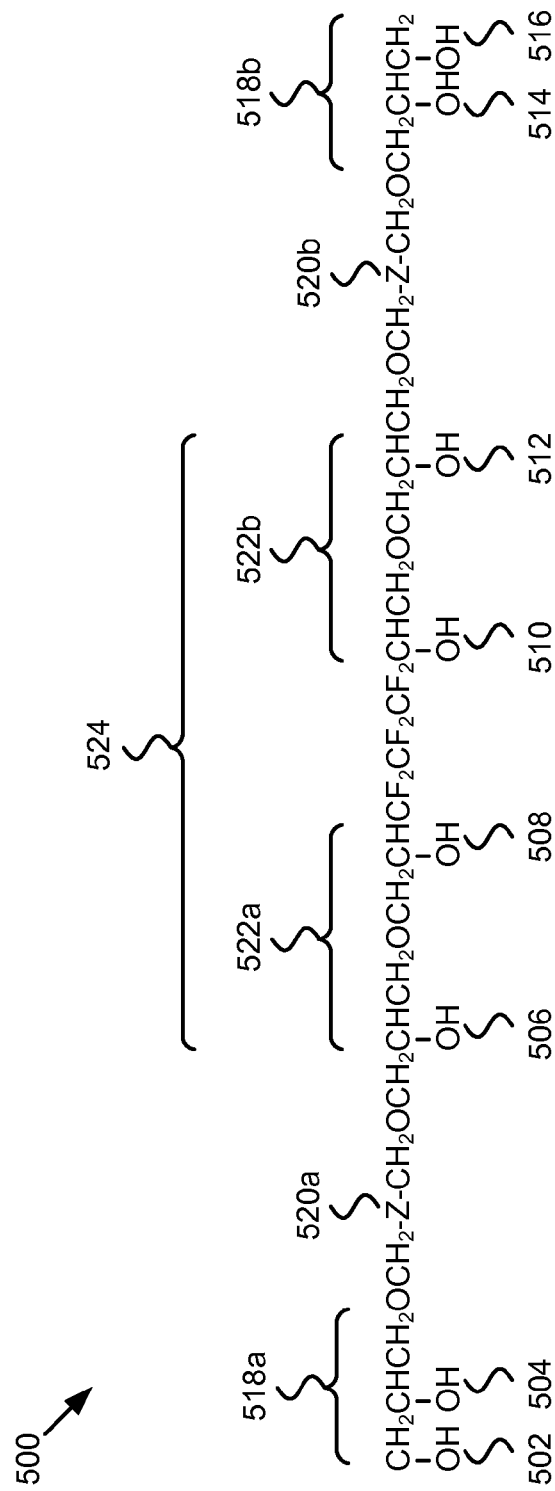
FIG. 5 illustrates one embodiment of a chemical structure of a ZTMD molecule.

In certain embodiments, the lubricant comprising the lubricant layer 308 may have additional hydroxyl groups or other functional groups disposed throughout the lubricant molecules. For example, FIG. 5 depicts one embodiment of a ZTMD molecule 500. The ZTMD molecule 500 has hydroxyl groups 522a and 522b disposed throughout the molecule 500 in addition to the hydroxyl end groups 518a and 518b. The PFPE backbone sections 520a and 520b have the same chemical structure as the Fomblin Z backbone structure 402 discussed above with reference to FIG. 4A. The hydroxyl groups 522a and 522b disposed between the PFPE backbone sections 520a and 520b of the ZTMD molecule 500 each have two OH groups 506, 508, 510 and 512 respectively. Each end group 518a and 518b also includes two OH groups 502, 504, 514 and 516 respectively. The eight OH groups 502-516 of the ZTMD molecule 500 provide an enhanced surface bonding characteristic when compared with the four OH groups 416-422 of the Z-TETRAOL molecule 410 or the two OH groups 412 and 414 of the Z-DOL molecule 408.

In addition to the enhanced surface bonding characteristics, the ZTMD molecule 500 may also have enhanced tribological characteristics over the Z-TETRAOL molecule 410 and the Z-DOL molecule 408. For example, because the ZTMD molecule 500 is more readily bonded with the exterior surface 202 of the disk 106a, the ZTMD molecule 500 can sustain a higher shear stress than the Z-TETRAOL molecule 410 or the Z-DOL molecule 408. That is, when the transducer head 104 comes in contact with exterior surface 202 of the disk 106a, the ZTMD molecules 500 are less likely to be removed from the exterior surface 202 of the disk 106a.

Additionally, a lubricant comprising ZTMD molecules 500 has a higher hydrophobicity and a lower surface energy leading to less adhesive interaction with the transducer head 104 than a Z-TETROAL lubricant or a Z-DOL lubricant. Further, because the ZTMD molecules have hydroxyl groups 522a and 522b positioned between the backbone sections 520a and 520b, the center portion 524 of the ZTMD molecule 500 is bonded to the exterior surface 202 of the disk 106a. The bonding between the center portion 524 of the ZTMD molecule 500 and the exterior surface 202 of the disk 106a results in a molecule 500 that lies flatter than the Z-TETRAOL molecule 510 or the Z-DOL molecule 508. A flatter lubricant allows for greater clearance between the transducer head 104 and the exterior surface 202 of the disk 106a and/or a lower fly height FH of the transducer head 104. Additionally, a flatter lubricant allows for better airflow over the lubricant layer 308 as the disk 106a is spun.

A lubricant having an enhanced surface bonding characteristic does not necessarily mean that the lubricant is a better lubricant than other possible lubricants. For example, as discussed above, the Z-TETRAOL molecule 410 has an enhanced surface bonding characteristic when compared with the Z-DOL molecule 408. However, the Z-DOL molecule 408, being less bonded to the exterior surface 202 of the disk 106a, has an enhanced tribological characteristic, namely enhanced mobility, over the Z-TETRAOL molecule 410. Therefore a lubricant comprising Z-DOL molecules 408 can more readily move to areas of the exterior surface 202 of the disk 106a where the lubricant has been removed due to contact between the transducer head 104 and the exterior surface 202 of the disk 106a. Conversely, a lubricant comprising Z-DOL molecules 408, being more mobile, is more likely to be spun off the disk 106a as the disk 106a rotates at high velocities. Additionally, lubricants which are relatively highly mobile may result in the waviness or ripples in the lubricant layer 308 which can affect the flyability of the transducer head 104 over the exterior surface of the disk 106a.

Figure 6:
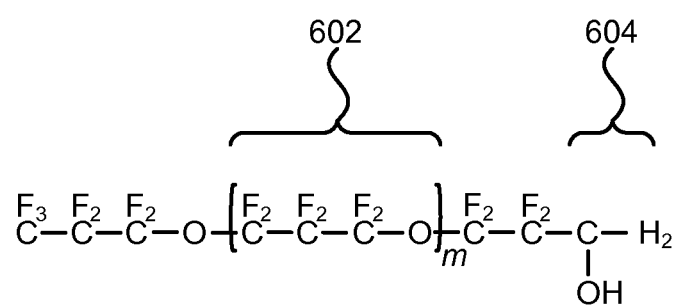
FIG. 6 illustrates one embodiment of a chemical structure of a Demnum molecule.

PFPE molecules are not limited to the Fomblin Z type backbone 402 shown in FIG. 4A. For example, FIG. 6 depicts an embodiment of a Demnum molecule 600. In certain embodiments, the Demnum molecule 600 includes a PFPE backbone section 602 and a single functional group 604 at one end of the molecule 600. Accordingly, the Demnum molecule 600 is considered a monofunctional PFPE molecule in that the Demnum molecule 600 has a single functional group 602 at one end of the molecule 600. A lubricant comprising Demnum molecules 600 has a lower viscosity and an enhanced thermal stability than many other PFPE lubricants which makes a lubricant comprising the Demnum molecules 600 an effective lubricant in a wide range of temperatures. Lubricants made of Demnum molecules 600 also exhibit a higher viscosity index than many other PFPE lubricants, that is, Demnum based lubricants exhibit a smaller change in viscosity with temperature change. Additionally, lubricants comprising Demnum molecules 600 exhibit a smaller evaporation loss at high temperatures than many of the other PFPE based lubricants.

Figure 7:
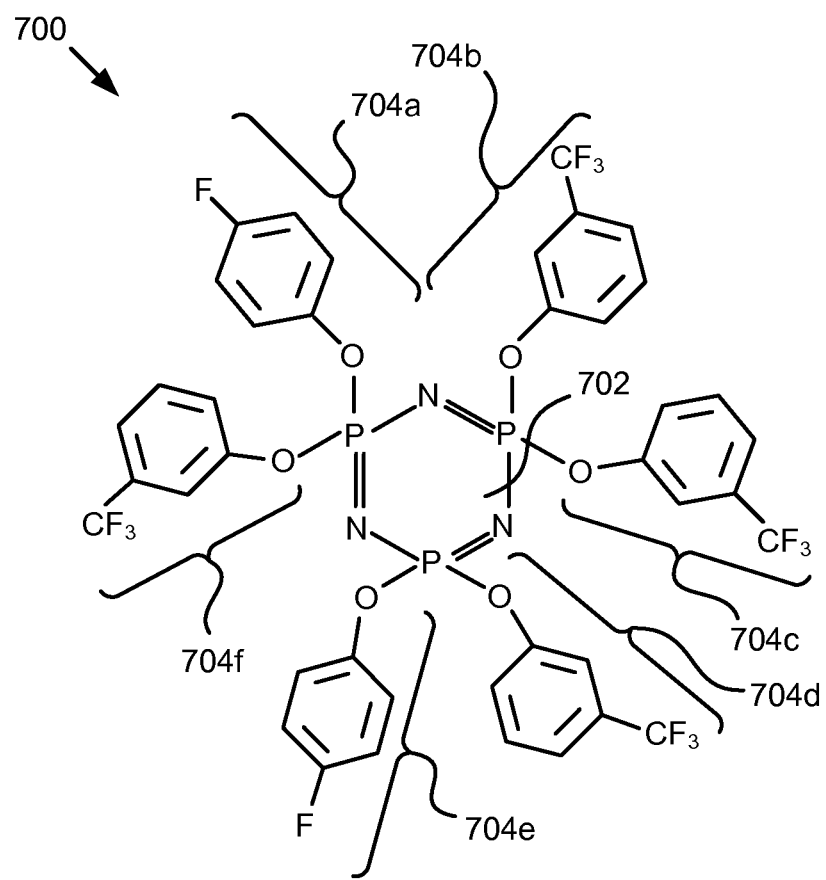
FIG. 7 illustrates one embodiment of a chemical structure of an X-1P molecule.

In certain embodiments, to improve the performance of the PFPE lubricant, an additive may be added to the PFPE lubricant. For example, FIG. 7 depicts one embodiment of an X-1P lubricant molecule 700 which can be added to a Fomblin Z type lubricant molecule, such as Z-TETRAOL 410, Z-DOL 408, ZTMD 500, etc., or to the Demnum type molecule 600 to enhance the performance of the lubricant. The X-1P lubricant molecule 700 includes a cyclic phosphazene 702 surrounded by six partially fluorinated phenoxy groups 704a-704f. When combined with a Fomblin Z type lubricant, the X-1P molecules 700 position themselves between the Fomblin Z type lubricant and the exterior surface 202 of the disk 106a preventing the Fomblin Z type lubricant from fully bonding to the exterior surface 202 of the disk 106a. Because the Fomblin Z type lubricant is not fully bonded to the exterior surface 202 of the disk 106a, the Fomblin Z type lubricant is more mobile than it would otherwise be. Lubricants comprising Fomblin Z type molecules 400 and X-1P molecules 700 demonstrate a lower surface energy than the Fomblin Z type molecules 400 alone. Additionally, the X-1P molecules 700 act as a Lewis base and prevent lubricant degredation due to the acidic nature of the Fomblin Z type molecules 400.

Figure 8:
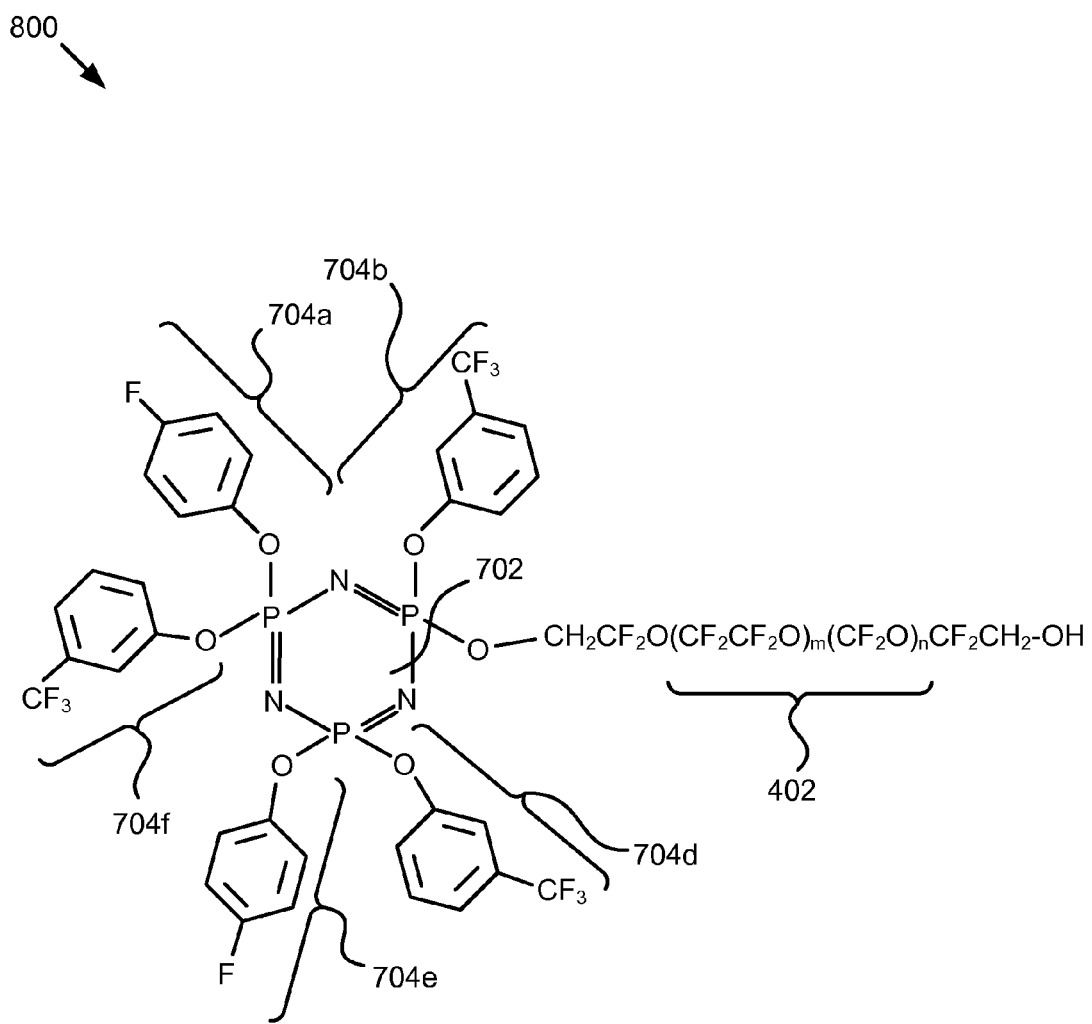
FIG. 8 illustrates one embodiment of a chemical structure of an A20H molecule.

FIG. 8 depicts an embodiment of an A20H molecule 800. The A20H molecule 800 is another molecule that has a cyclic phosphazene group 702. The A20H molecule 800 is based on a combination of the X-1P molecule 700 and the Fomblin Z type backbone 402 of the Fomblin Z type PFPE molecule 400. As can be seen, one of the partially fluorinated phenoxy groups, group 704c has been substituted with the Fomblin Z type backbone 402. The A20H molecule 800 can be mixed with the Z-TETRAOL molecules 410, the Z-DOL molecules 408, the ZTMD molecules 500, or the Demnum molecules 600 to enhance the performance of theses lubricants. The A20H molecule 800 has an enhanced surface bonding characteristic and readily bonds with the exterior surface 202 of the disk 106a. The A20H molecule 800 also decreases the degradation of the Fomblin Z type lubricant when mixed with the Fomblin Z type lubricant.

The A20H molecule 800 is an example of a Fomblin Z type molecule 400 hybrid wherein the PFPE backbone 402 has been chemically altered by the addition of the cyclic phosphazine group 702 and the corresponding partially fluorinated phenoxy groups 704 of the X-1P molecule 700 to enhance the tribological characteristics of the A20H lubricant. While lubricants comprising A20H molecules exhibit enhanced tribological characteristics over the Fomblin Z type lubricants, namely enhanced mobility, enhanced degradation resistance, etc., the creation of the A20H lubricant involves chemically combining the Fomblin Z type lubricant backbone 402 with the X-1P molecule 700. The chemical combination of the Fomblin Z type lubricant backbone 402 and the X-1P molecule 700 reduces the number of functional end groups 404 resulting in a weaker surface bonding characteristic than many of the other Fomblin Z type lubricants.

In certain embodiments, in order to enhance both the surface bonding characteristics of the lubricant layer 308, as well as the tribological characteristics of the lubricant layer 308, the lubricant layer 308 may comprise a first lubricant combined with a second lubricant and/or lubricant additive. By combining a lubricant with another lubricant and/or lubricant additive, the surface bonding characteristics and the tribological characteristics of the lubricant layer 308 can be enhanced over a lubricant layer having a single lubricant. One problem encountered in combining a lubricant with another lubricant, or lubricant additive, occurs when the two lubricants, or the lubricant and the lubricant additive, are immiscible. In such a case, the two lubricants, or the lubricant and the lubricant additive may separate. For example, for a lubricant layer 308 comprising Z-DOL molecules 408 and X-1P molecules 700, the X-1P molecules 700 are immiscible in the Z-DOL lubricant in amounts greater than about 10% by weight. Where the X-1P lubricant is present in an amount greater than about 10% by weight, phase separation between the two lubricants may occur.

Figure 9:
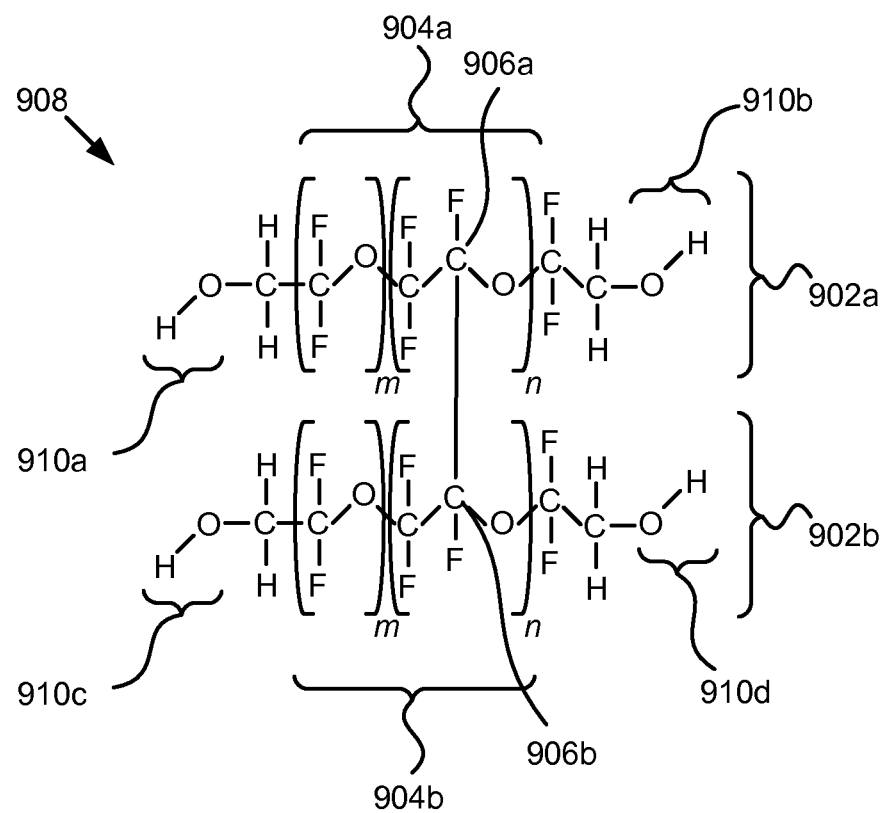
FIG. 9 illustrates a diagram of one embodiment of two cross-linked Z-DOL molecules.

In certain embodiments, to avoid separation between the two or more lubricants or the lubricant and the lubricant additive, the two or more lubricants or the lubricant and the lubricant additive may be cross-linked to create a cross-linked lubricant for the lubricant layer 308. For example, FIG. 9 depicts one embodiment of two Z-DOL molecules 902a and 902b having cross-linked backbone sections 904a and 904b. In certain embodiments, the Z-DOL molecules 902a and 902b may be substantially similar to the Z-DOL molecule 408 discussed above.

While the embodiment illustrated in FIG. 9 depicts carbon atoms 906a and 906b as being cross-linked, one of skill in the art will recognize that any carbon atom along Z-DOL molecule 902a may be cross-linked with any carbon atom along Z-DOL molecule 902b. In certain embodiments, a plurality of carbon atoms from Z-DOL molecule 902a may be cross-linked with a plurality of carbon atoms from Z-DOL molecule 902b. Further, additional Z-DOL molecules (not shown) may be cross-linked with Z-DOL molecule 902a and/or Z-DOL molecule 902b to create a cross-linked lubricant for the lubricant layer 308.

The cross-linking between the Z-DOL molecules 902a and 902b results in a cross-linked lubricant 908 having multiple functional groups 910a-910d. Thus, instead of two functional groups of a plurality of single Z-DOL molecules, such as functional group X 404a and functional group Y 404b of Z-DOL molecule 408, the cross-linked lubricant 908 has a plurality of functional groups 910a-910d. While the embodiment illustrated in FIG. 9 depicts only two Z-DOL molecules 902a and 902b with four total functional groups 910a-910d, one of skill in the art will recognize that multiple Z-DOL molecules may be cross-linked in the cross-linked lubricant 908, with each Z-DOL molecule adding two functional groups to the overall cross-linked lubricant 908.

While the embodiment illustrated in FIG. 9 depicts two Z-DOL molecules 902a and 902b as being cross-linked, one of skill in the art will recognize that other lubricant molecules may be cross-linked to one another. Additionally, the present subject matter is not limited to cross-linking between two lubricant molecules of the same type. For example, in one embodiment one or more Z-DOL molecules 408 may be cross-linked with one or more Z-TETRAOL molecules 410. In other embodiments other combinations of lubricants may be cross-linked with one another. The present subject matter is not limited to cross-linking two types of lubricants, but may include three or more different types of lubricants cross-linked with one another.

Figure 10:
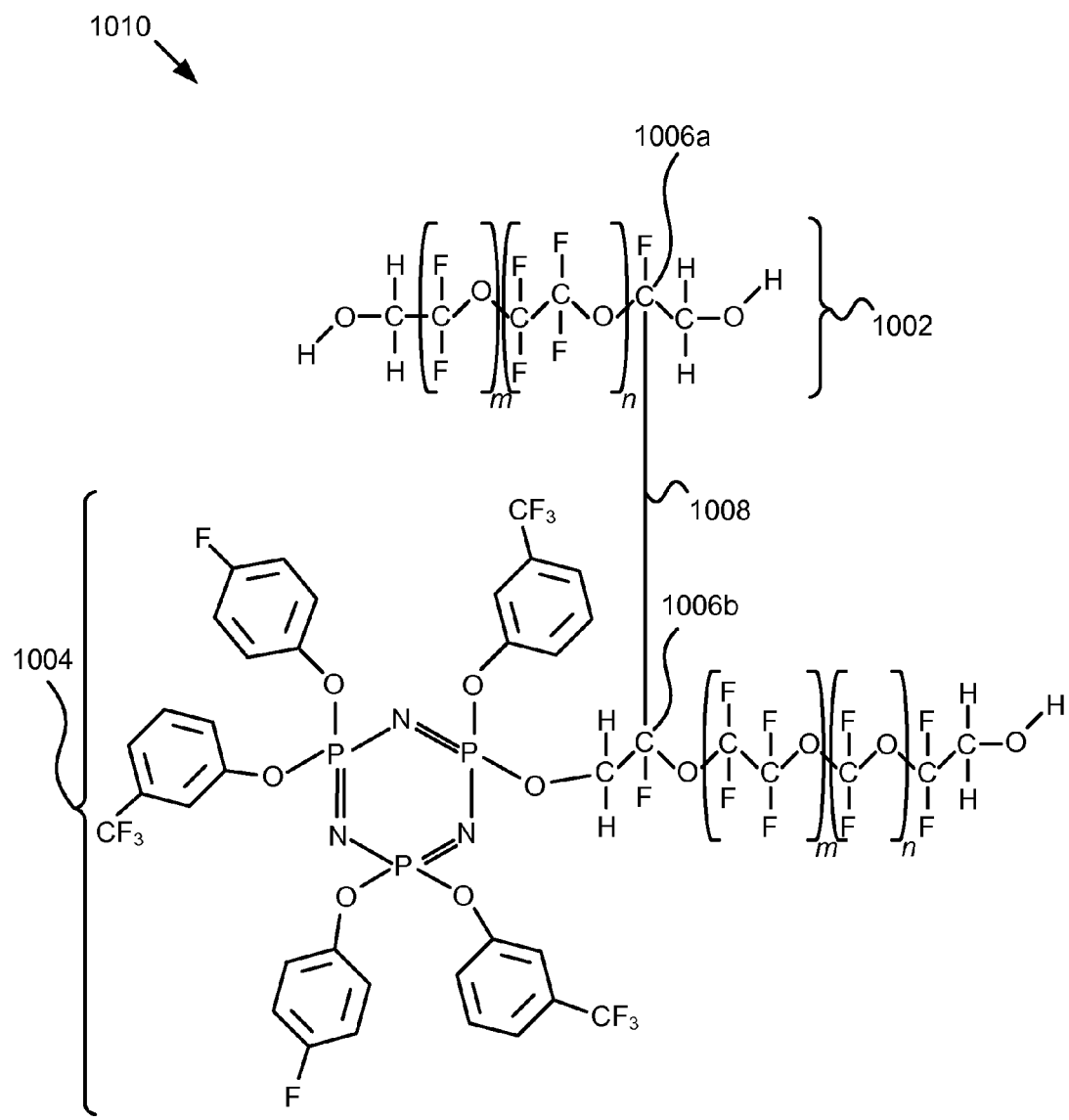
FIG. 10 illustrates a diagram of one embodiment of a Z-DOL molecules cross-linked with an A20H molecule.

In certain embodiments, one or more lubricants may be cross-linked with a lubricant additive. For example, FIG. 10 depicts one embodiment of a Z-DOL molecule 1002 cross-linked with an A20H molecule 1004. The Z-DOL molecule 1002 is substantially similar to the Z-DOL molecules 408, 902a, and 902b described above. The A20H molecule 1004 is substantially similar to the A20H molecule 800 described above.

In the embodiment illustrated in FIG. 10, carbon atom 1006a on the Z-DOL molecule 1002 has been cross-linked with carbon atom 1006b on the A20H molecule 1004. As discussed above, in certain embodiments, the cross-linking may occur between any carbon atom on either molecule. By cross-linking the Z-DOL molecule 1002 with the A20H molecule 1004, the resulting lubricant 1010 has the enhanced surface bonding characteristics of the Z-DOL molecule 1002 as well as the enhanced tribological characteristics of the A20H molecule 1004 discussed above.

While the cross-link between the Z-DOL molecule 1002 and the A20H molecule 1004 is depicted as a much longer bond 1008 than the other bonds in either molecule, one of skill in the art will recognize that in practice, the Z-DOL molecule 1002 and the A20H molecule 1004 will be oriented to minimize the energy required to create the cross-link bond 1008. This is also true where three or more molecules are cross-linked with one another. In such an embodiment, each molecule will be oriented in a position to minimize the energy required to create the cross-linked bonds between each molecule.

FIG. 10 depicts a Z-DOL molecule 1002 cross-linked with an A20H molecule 1004. In other embodiments, any lubricant molecule or molecules may be cross-linked with any lubricant additive molecule or molecules. In certain embodiments, the lubricant additives may be cross-linked with one another without being cross-linked to a lubricant.

In certain embodiments, to cross-link the lubricant molecule to another lubricant molecule or to a lubricant additive, the lubricant molecule is treated with a physical treatment. Examples of physical treatments that may be used to cross-link the lubricant molecule to another lubricant molecule or to a lubricant additive include heating the lubricant(s) and/or lubricant additive(s), increasing the pressure on the lubricant(s) and/or lubricant additive(s), changing the pH for the lubricant(s) and/or lubricant additive(s), irradiating the lubricant(s) and/or lubricant additive(s), adding a catalyst to the lubricant(s) and/or lubricant additive(s), etc. In certain embodiments, the lubricant(s) and/or lubricant additive(s) are cross-linked by subjecting the lubricant(s) and/or lubricant additive(s) to a radiation source selected from an electron beam, gamma-radiation, and an ultraviolet light source.

Figure 11:
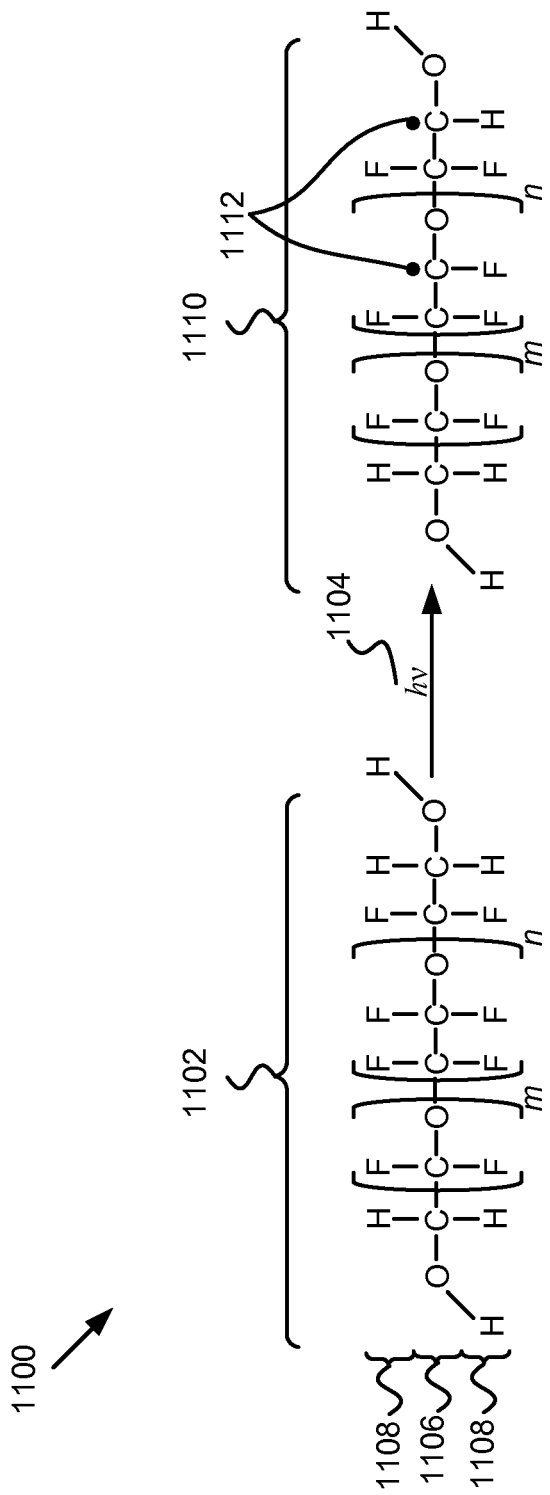
FIG. 11 illustrates one embodiment of a bond breaking reaction resulting from the treatment of a Z-DOL molecule with ultraviolet radiation.

FIG. 11 depicts one embodiment of a bond breaking reaction 1100 resulting from the treatment of a Z-DOL molecule 1102 with ultraviolet radiation 1104. Treating the Z-DOL molecule 1102 with ultraviolet radiation 1104 breaks the covalent bond between one or more atoms 1106 along the backbone of the Z-DOL molecule 1102 and one or more atoms 1108 bonded to the backbone atoms 1106. The resulting Z-DOL molecule 1110 includes one or more free radicals 1112 where the bonds were broken.

In the absence of a free radical scavenger, the resulting Z-DOL molecule 1110 with the free radicals 1112 can do one of three things, it can recombine with the atoms that were removed and revert back to its original state, it can react with an adjoining free radical on the same chain to form double or triple bonds, or it can cross-link with a nearby molecule having free radicals by bonding with the free radicals on the nearby molecule.

If a solvent or other chemical is present during the process of treating the lubricant molecule and/or lubricant additive with ultraviolet radiation, the ultraviolet radiation may cause the solvent or other chemical to form free radicals. In such a case, the free radicals from the solvent or other chemical may cross-link with the free radicals on the lubricant and/or lubricant additive to form potentially undesirable end products. Thus, in certain embodiments, in order to cross-link two or more lubricant molecules and/or a lubricant molecule and a lubricant additive, the lubricant and/or lubricant additive may be treated in a neat sate. That is, in one embodiment, the lubricant(s) and/or lubricant(s) and the lubricant additive(s) may be substantially solvent free when they are exposed to the ultraviolet radiation 1104.

Figure 12A:
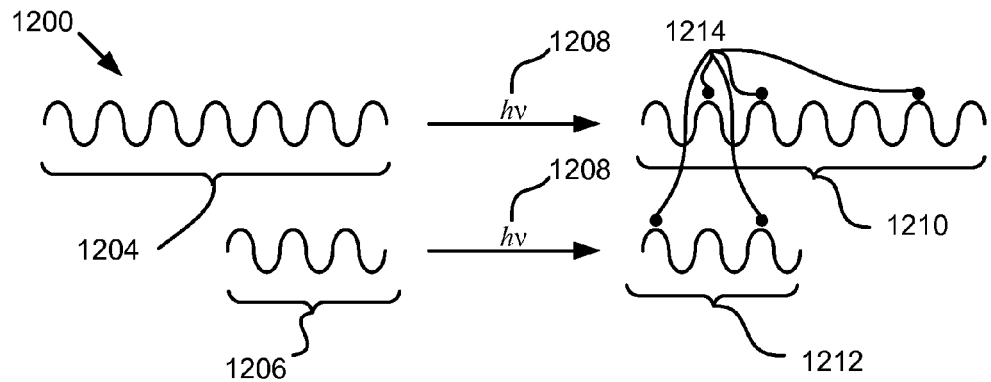
FIG. 12A illustrates a bond breaking reaction resulting from the treatment of two lubricant molecules and/or lubricant additive molecules with ultraviolet radiation.

FIG. 12A is a schematic block diagram of a bond breaking reaction 1200 resulting from the treatment of two lubricant molecules and/or lubricant additive molecules 1204 and 1206 with ultraviolet radiation 1208. In the embodiment illustrated in FIG. 12A, to aid in the present discussion, the lubricant molecules and/or lubricant additive molecules 1204 and 1206 are depicted as having differing lengths to indicate that the lubricant molecules and/or lubricant additive molecules 1204 and 1206 are different molecules. This distinction is relevant to FIGS. 12B and 12C as further discussed below.

The reaction 1200 occurs in a manner substantially similar to reaction 1100 and results in two lubricant molecules and/or lubricant additive molecules 1210 and 1212 having free radicals 1214. In the absence of a free radical scavenger, such as a free radical on a solvent, the two lubricant molecules and/or lubricant additive molecules 1210 and 1212 having free radicals 1214 may cross-link with each other.

Figure 12B:
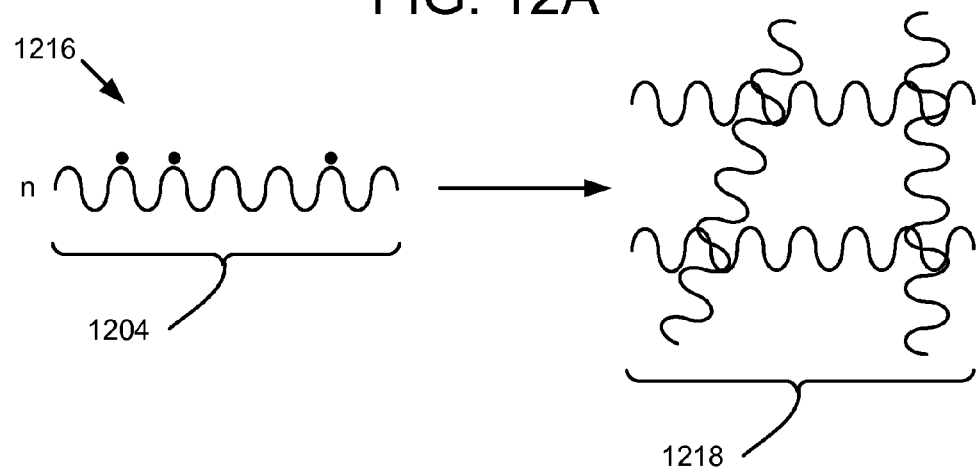
FIG. 12B illustrates a cross-linking reaction where there is a single type of lubricant or lubricant additive molecules.

FIG. 12B depicts a reaction 1216 that occurs where there is a single type of lubricant or lubricant additive molecule such as lubricant or lubricant additive molecule 1204. In such an embodiment, n number of lubricant molecules or lubricant additive molecules 1204 cross-link with one another to form a cross-linked lubricant or lubricant additive 1218. In this case, the cross-linked lubricant or lubricant additive 1218 has the same backbones throughout.

Figure 12C:
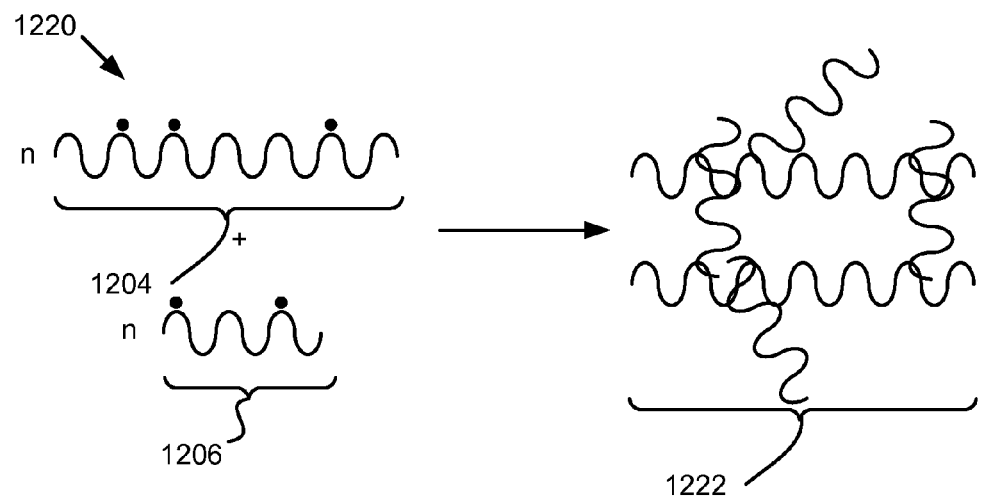
FIG. 12C illustrates a cross-linking reaction where there are different types of lubricant or lubricant additive molecules.

FIG. 12C depicts a reaction 1220 that occurs where there two or more types of lubricant molecules and/or lubricant additive molecules such as lubricant molecules and/or lubricant additive molecules 1204 and 1206 are combined. In such an embodiment, n number of lubricant molecules or lubricant additive molecules 1204 and n number of lubricant molecules or lubricant additive molecules 1206 cross-link with one another to form a cross-linked lubricant and/or a cross-linked lubricant additive 1222.

Figure 13:
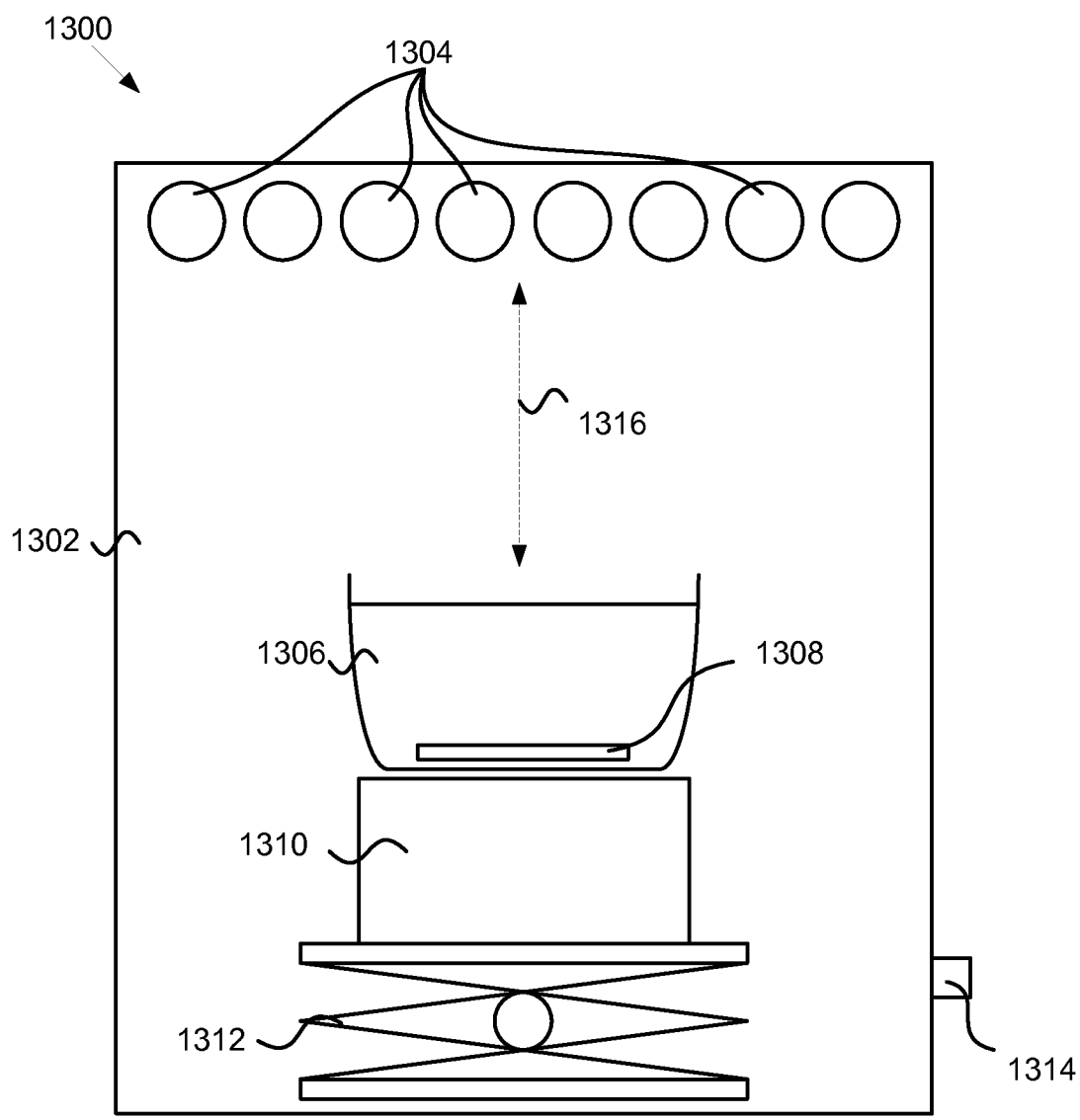
FIG. 13 illustrates a schematic block diagram of one embodiment of an apparatus for forming a cross-linked lubricant film for magnetic recording applications.

FIG. 13 depicts a schematic block diagram of one embodiment of an apparatus 1300 for forming a cross-linked lubricant film for magnetic recording applications. The cross-linked lubricant film, in one embodiment, may be used as the lubricant layer 308 described above. In certain embodiments, the apparatus includes an oven 1302, a radiation source 1304, a container 1306, a stirring bar 1308, a stirring unit 1310, a height adjustment unit 1312, and a purging unit 1314.

The oven 1302, in certain embodiments, is a sealed ultraviolet oven which includes a radiation source 1304. The radiation source 1304 comprises one or more ultraviolet lamps. The ultraviolet lamps, in one embodiment have an ultraviolet wavelength of about 185 nm or 172 nm depending on the type of lamps installed. In other embodiments, the ultraviolet lamps may have a wavelength of any commercially available ultraviolet lamp. In yet another embodiment, the wavelength of the ultraviolet lamp may be specifically developed for the present subject matter and may not be limited to wavelengths of commercially available ultraviolet lamps.

In one embodiment, to develop the lubricant film for use as the lubricant layer 308, one or more neat lubricants and/or one or more neat lubricant additives are positioned in the container 1306. In certain embodiments, the container 1306 is a shallow beaker configured to maintain the lubricant(s) and/or lubricant additive(s) as the lubricant(s) and/or lubricant additive(s) are treated with ultraviolet radiation from the radiation source 1304. In one embodiment, the container 1306 is transparent such that the radiation can easily penetrate the lubricant(s) and/or lubricant additive(s) without being blocked by the container 1306.

In certain embodiments, stirring bar 1308 is positioned within the container 1306. The stirring bar 1308, in one embodiment, is in magnetic communication with the stirring unit 1310. The stirring unit 1310 operates to rotate the stirring bar 1308 within the container 1306 to mix the lubricant(s) and/or lubricant additive(s) as the lubricant(s) and/or lubricant additive(s) are treated with ultraviolet radiation from the radiation source 1304. While the apparatus 1300 of FIG. 13 illustrates a magnetic stirring device, one of skill in the art will recognize that the lubricant(s) and/or lubricant additive(s) may be mixed according to any other process known in the art.

The height adjustment unit 1312 adjusts a distance between the radiation source 1304 lubricant(s) and/or the lubricant additive(s) as indicated by arrow 1316. By adjusting the distance between the radiation source 1304 and the lubricant(s) and/or lubricant additive(s), and by varying the radiation duration, the operator can control an amount of cross-linking between the two or more lubricants and/or an amount of cross-linking between the lubricant(s) and the lubricant additive(s).

In one embodiment, in order to avoid unwanted products resulting from a free radical scavenger bonding with the lubricant molecules and/or lubricant additive molecules 1204 and 1206, the radiation of the lubricant(s) and/or lubricant additive(s) may be done in with an inert gas filling the oven 1302. For example, in one embodiment, the oven 1302 includes a purging unit 1314 that purges oxygen from the oven 1302 and replaces it with an inert gas such as argon, helium, nitrogen, etc. By purging the oven 1302 of oxygen, unwanted by-products can be avoided. Further, because the lubricant(s) and/or the lubricant additive(s) are treated in their neat state, cross-linking occurs only between the lubricant(s) and/or the lubricant additive(s) as there is no solvent with which the lubricant(s) and/or the lubricant additive(s) can cross-link.

Subjecting the lubricant(s) and/or lubricant additive(s) to the ultraviolet radiation causes a change in the viscosity of the lubricant(s) and/or lubricant additive(s) over time. In certain embodiments, the amount of cross-linking between the two or more lubricants and/or the amount of cross-linking between the lubricant(s) and the lubricant additive(s) may be controlled by monitoring the viscosity change in the lubricant(s) and/or the lubricant additive(s). An increase in viscosity of more than about 35% (about a 0.13% increase in density) indicates the occurrence of cross-linking in the molecular chains of the Fomblin Z lubricant.

Figure 14A:
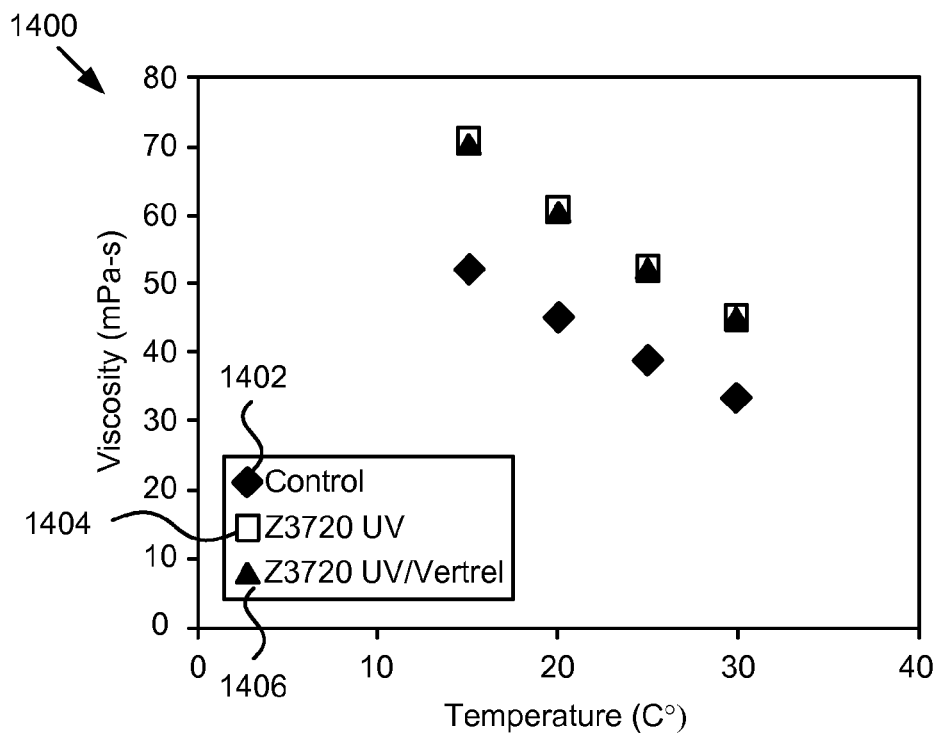
FIG. 14A depicts a graph of viscosity as a function of temperature for a Fomblin Z type lubricant, an ultraviolet cross-linked Fomblin Z-Type lubricant, and an ultraviolet cross-linked Fomblin Z-Type lubricant that has been dissolved in a Vertrel XF solvent.
Figure 14B:
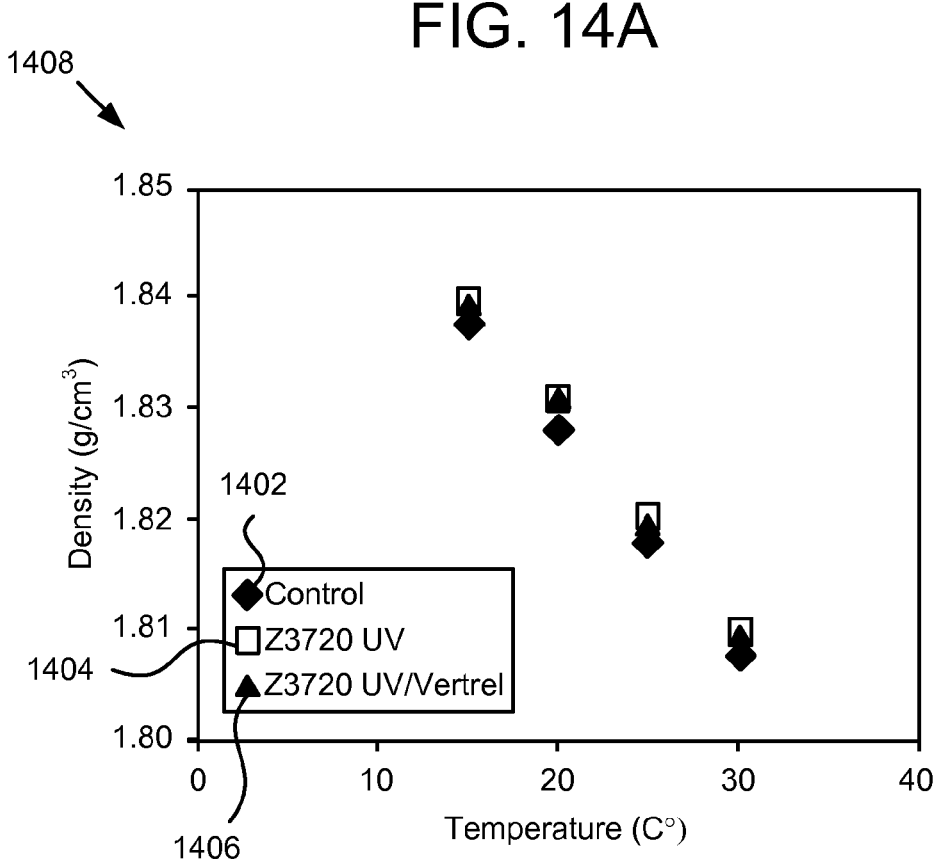
FIG. 14B depicts a graph of density as a function of temperature for a Fomblin Z type lubricant, an ultraviolet cross-linked Fomblin Z-Type lubricant, and an ultraviolet cross-linked Fomblin Z-Type lubricant that has been dissolved in a Vertrel XF solvent.

FIG. 14A depicts a graph 1400 of viscosity as a function of temperature for a Fomblin Z type lubricant 1402, an ultraviolet cross-linked Fomblin Z-Type lubricant 1404, and an ultraviolet cross-linked Fomblin Z-Type lubricant that has been dissolved in a Vertrel XF solvent 1406 and the solvent is evaporated afterwards. FIG. 14B depicts a graph 1408 of density as a function of temperature for the Fomblin Z type lubricant 1402, the ultraviolet cross-linked Fomblin Z-Type lubricant 1404, and the ultraviolet cross-linked Fomblin Z-Type lubricant that has been dissolved in a Vertrel XF solvent 1406 and the solvent is evaporated afterwards.

To cross-link molecular chain of the Fomblin Z-Type lubricant 1402, the Fomblin Z-Type lubricant 1402 was subjected to ultraviolet radiation at 185 nm for seven days until the Fomblin Z-Type lubricant 1402 showed an increase in viscosity of about 35% and an increase in density of about 0.13%. The cross-linked Fomblin Z-Type lubricant 1404 was dissolved in a Vertrel XF solvent and the solvent was evaporated at 70° C. As can be seen, the viscosity and density does not change between the cross-linked Fomblin Z-Type lubricant 1404 and the Fomblin Z-Type lubricant dissolved in the Vertrel XF solvent 1406 and the solvent is evaporated afterwards. This indicates that the cross-linking is not broken down in solution. The cross-linking is stable even after treatment at 60° C. for six days with continuous stirring.

FIG. 15 depicts a chart 1500 showing nuclear magnetic resonance analysis of the components of various lubricants and lubricant additives before and after the lubricants and lubricant additives have been treated in their neat state with ultraviolet radiation at 172 nm for 30 minutes. As can be seen, there is no significant change or degradation in the molecular structures of the lubricants or lubricant additives when the lubricants or lubricant additives are cross-linked. This suggests that functionality (durability and bonding characteristics) is not affected by cross-linking the lubricants or lubricant additives.

Figure 16:
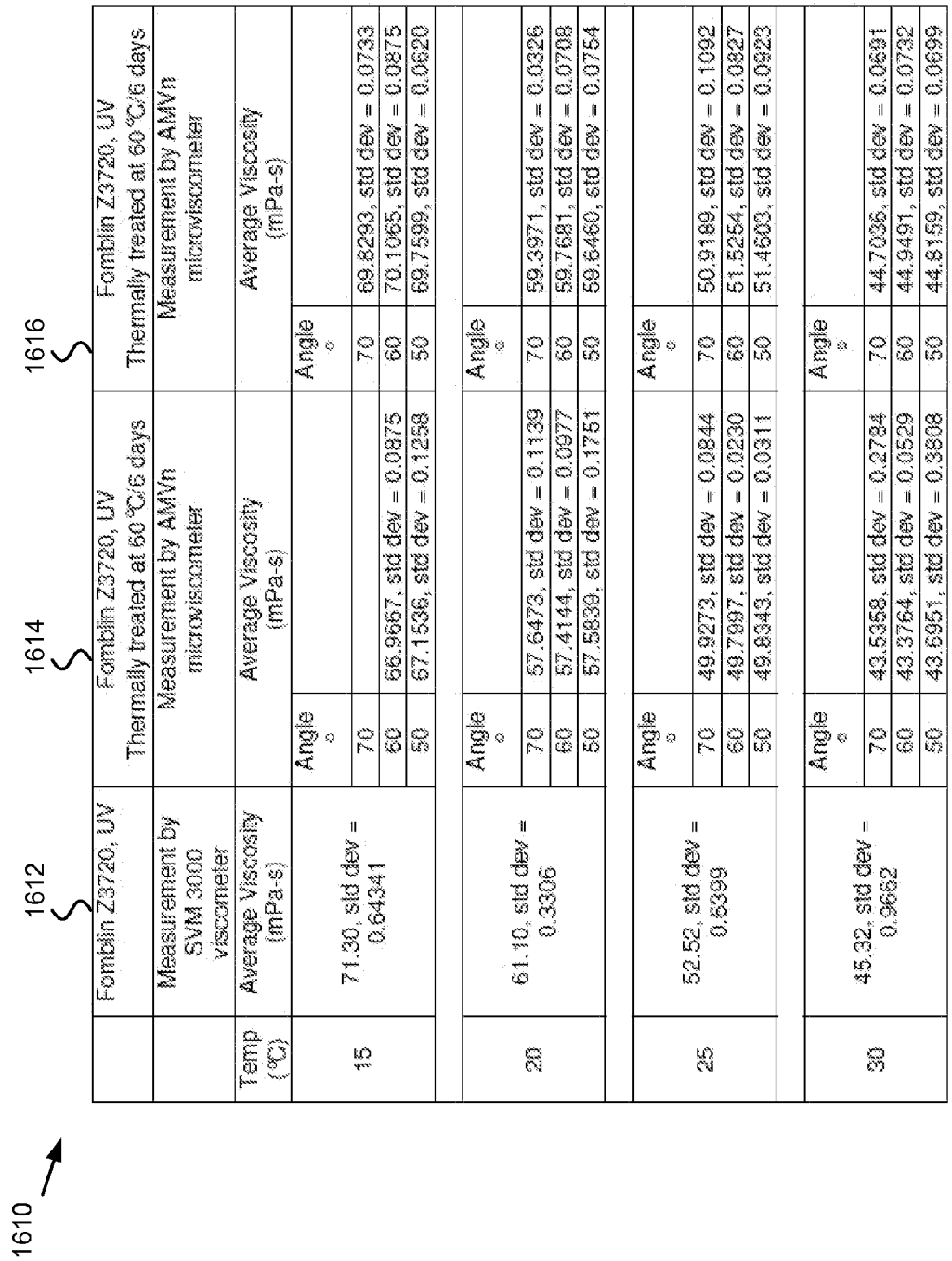
FIG. 16 depicts a chart showing shear viscosity versus temperature for a cross-linked Fomblin Z-Type Lubricant.

FIG. 16 depicts a chart 1610 of shear viscosity versus temperature for a cross-linked Fomblin Z-Type lubricant. To cross-link the Fomblin Z-Type lubricant, the lubricant was treated with ultraviolet radiation for seven days. The second column 1612 of chart 1610 contains data on an average viscosity for the cross-linked Fomblin Z-Type lubricant over various temperatures (i.e., 15° C., 20° C., 25° C., and 30° C.) as measured by a SVM 3000 viscometer. For the data contained in the third column 1614 and the fourth column 1616 of chart 1610, the cross-linked Fomblin Z-Type lubricant was thermally treated at 60° C. for six days. As can be seen, there was no significant viscosity reduction in the cross-linked Fomblin Z-Type lubricant. This suggests that the ultraviolet cross-linked Fomblin Z-Type lubricant is stable when the subjected to various conditions.

Figure 17:
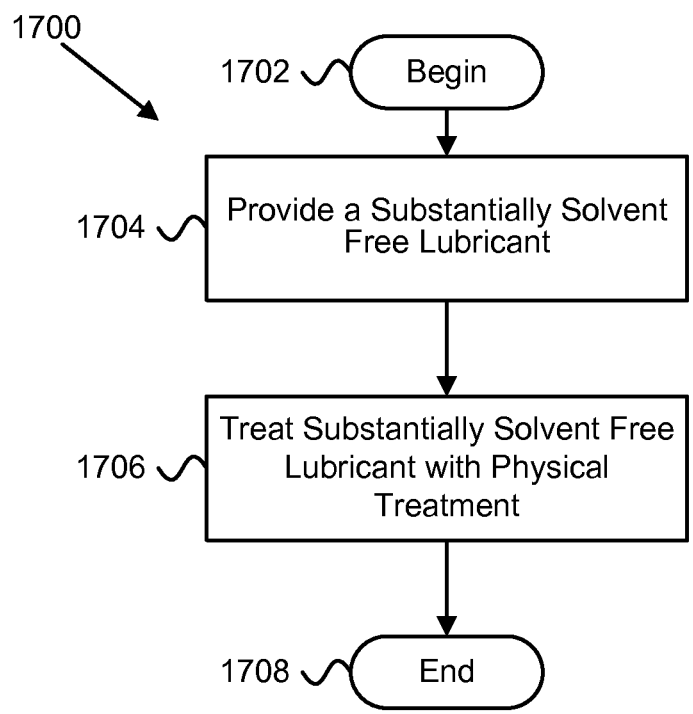
FIG. 17 is a schematic flow chart diagram illustrating one embodiment of a method for forming a lubricant film for magnetic recording applications.

FIG. 17 is a schematic flow chart diagram illustrating one embodiment of a method 1700 for forming a lubricant film for magnetic recording applications. In certain embodiments, the method 1700 may be practiced with the apparatus 1300 discussed above to form a lubricant film for use as a lubricant layer 308 on a magnetic recording disk such as disk 106a.

The method 1700 begins 1702 and a substantially solvent free lubricant is provided 1704. In certain embodiments, the at least one substantially solvent free lubricant includes a plurality of lubricant molecules such as a plurality of Z-DOL molecules 408, Z-TETRAOL molecules 410, ZTMD 500 molecules, etc. Each lubricant molecule includes a polymer chain having a backbone section and at least one functional end group.

The at least one substantially solvent free lubricant is treated 1706 with a physical treatment to cross-link the backbone section of each polymer chain of each lubricant molecule with at least one other molecule to create a cross-linked lubricant such as cross-linked lubricants 1218 and 1222. In one embodiment, the method ends 1708 upon creating the cross-linked lubricant 1218 or 1222.

In one embodiment, the physical treatment includes a treatment selected from heating the at least one substantially solvent free lubricant, increasing pressure on the at least one substantially solvent free lubricant, changing the pH for the at least one substantially solvent free lubricant, irradiating the at least one substantially solvent free lubricant, and adding a catalyst to the at least one substantially solvent free lubricant. In certain embodiments, irradiating the at least one substantially solvent free lubricant includes exposing the at least one substantially solvent free lubricant to a radiation source selected from an electron beam, gamma-radiation, and an ultraviolet light source. In an exemplary embodiment, the physical treatment includes exposing the at least one substantially solvent free lubricant to a radiation source 1304, such as an ultraviolet light source. In such an embodiment, the ultraviolet light source may have a wavelength selected from 185 nm and 172 nm.

In certain embodiments, the at least one other molecule may be a molecule having substantially the same chemical structure as the at least one substantially solvent free lubricant. That is, in one embodiment, a molecule of the substantially solvent free lubricant may be cross-linked with another molecule of the substantially solvent free lubricant.

In other embodiments, the substantially solvent free lubricant and the at least one other molecule may have different molecular structures. In certain embodiments, the substantially solvent free lubricant and the at least one other molecule may be two lubricants. In either embodiment, the substantially solvent free lubricant and the at least one other molecule may be selected to complement each other. That is, in one embodiment, the substantially solvent free lubricant may have an enhanced surface bonding characteristic with respect to the at least one other molecule. In such an embodiment, the at least one other molecule may be selected for having enhanced tribological characteristics over the substantially free lubricant. Of course, in certain embodiments, the substantially solvent free lubricant may be selected for its enhanced tribological characteristics over the at least one other molecule and the at least one other molecule may be selected for its enhanced surface bonding characteristics over the substantially solvent free molecule.

In certain embodiments, the at least one other molecule may be a lubricant additive. In such an embodiment, the lubricant additive may be a lubricant additive selected from X-1P, A20H, etc.

Figure 18:
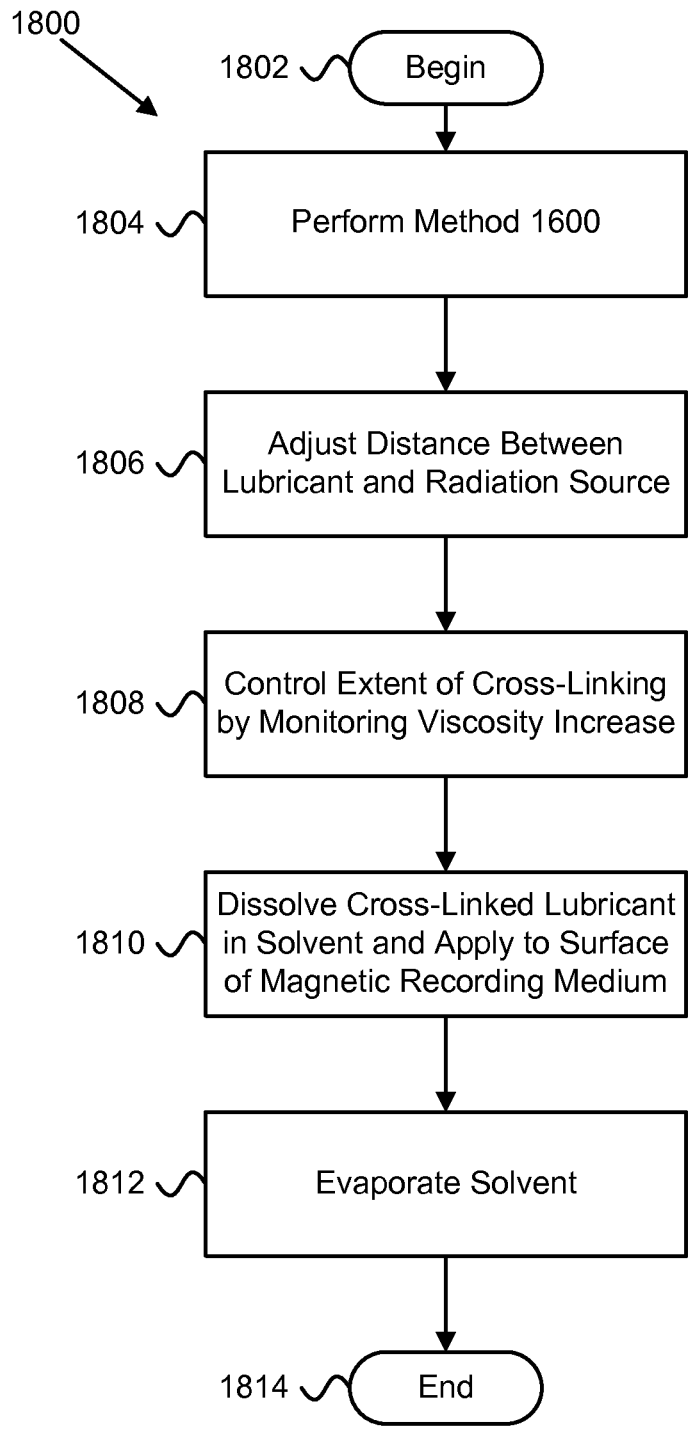
FIG. 18 is a schematic flow chart diagram illustrating one embodiment of a method for forming a lubricant film for magnetic recording applications.

FIG. 18 is a schematic flow chart diagram illustrating one embodiment of a method 1800 for forming a lubricant film for magnetic recording applications. In certain embodiments, the method 1800 begins 1802 and the steps of method 1700 are performed 1804.

In certain embodiments, the method 1800 includes adjusting 1806 a distance between the radiation source 1304, such as the ultraviolet lights, and the at least one substantially solvent free lubricant. In one embodiment, the distance between the radiation source 1304 and the at least one substantially solvent free lubricant is adjusted to optimize cross-linking between the backbone section of each polymer chain of the plurality of substantially solvent free lubricant molecules and the at least one other molecule.

In another embodiment, the extent of cross-linking between the backbone section of each polymer chain and the at least one other molecule is controlled 1808 by monitoring an increase in viscosity of the at least one substantially solvent free lubricant. In certain embodiments, the substantially solvent free lubricant is treated 1706 with the physical treatment until the viscosity of the substantially solvent free lubricant is increased by at least about thirty-five percent.

In certain embodiments, the cross-linked lubricant 1218 or 1222 is dissolved 1810 in a solvent and the cross-linked lubricant 1218 or 1222 and the solvent is applied to an exterior surface 202 of a magnetic recording medium such as disk 106a. In one embodiment, the solvent is a Vertrel XF solvent. In other embodiments, the solvent may be any other solvent known in the art. The solvent is evaporated 1812 from the cross-linked lubricant 1218 or 1222 leaving the cross-linked lubricant 1218 or 1222 on the exterior surface 202 of the disk 106a and the method ends 1814. By cross-linking the lubricant before applying the cross-linked lubricant 1218 or 1222 to the exterior surface 202 of the disk, the methods 1700 and 1800 avoid the added steps and costs associated with cross-linking the lubricant on each side of the disk 106a.

Cross-linking two or more neat lubricants and/or neat lubricant additives before applying the cross-linked lubricant mixture 1218 or 1222 to the disk 106a reduces the costs associated with cross-linking a lubricant mixture on each side of the disk 106a. Additionally, a much wider selection of lubricants and/or lubricant additives may be used as the cross-linking between the lubricants and/or lubricant additives reduces the problems associated with immiscible lubricants and/or lubricant additives. Similarly, cross-linking two or more lubricants and/or lubricant additives allows for a wider range of mixing proportions between the two or more lubricants and/or lubricant additives. For example, X-1P is generally immiscible in Z-DOL in amounts greater than about 10% by weight. By cross-linking X-1P with Z-DOL, a larger proportion of X-1P may be used in a lubricant mixture comprising X-1P and Z-DOL.

By combining two or more lubricants and/or lubricant additives a distance between functional groups of the combined lubricant mixture may be minimized. This can lead to enhanced surface bonding between the lubricant layer 308 and the exterior surface 202 of the disk 106a which may ultimately lead to increased media durability.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for forming a lubricant film for magnetic recording applications, the method comprising:
    combining a first type of lubricant molecules and a second type of lubricant molecules to form a solvent free lubricant, wherein each first type of lubricant molecule and each second type of lubricant molecule comprises a polymer chain having a backbone section and at least one functional end group, wherein the at least one functional end group of the first type of lubricant molecules is different than the at least one functional end group of the second type of lubricant molecules;

treating the solvent free lubricant with a physical treatment to cross-link the backbone section of the first type of lubricant molecules to the backbone section of the second type of lubricant molecules to create a cross-linked lubricant;

dissolving the cross-linked lubricant in a solvent to form a lubricant solution; and after dissolving the cross-linked lubricant in the solvent, forming a lubricant layer over a magnetic medium by applying the lubricant solution to the magnetic medium and subsequently evaporating the solvent.

2. A method for forming a lubricant film for magnetic recording applications, the method comprising:

providing hybrid lubricant molecules that each comprise a cyclic phosphazene portion covalently bonded to a PFPE chain portion;

combining the hybrid lubricant molecules with PFPE molecules to form a solvent free combination, each PFPE chain portion of the hybrid lubricant molecules and each PFPE molecule comprising a backbone section and at least one functional end group;

treating the solvent free combination with a physical treatment to cross-link the backbone section of the PFPE chain portions of the hybrid lubricant molecules with the backbone section of the PFPE molecules to create a cross-linked lubricant comprising cross-linked lubricant molecules, wherein each cross-linked lubricant molecule has more end functional groups than each hybrid lubricant molecule and each PFPE molecule, taken individually;

dissolving the cross-linked lubricant in a solvent to form a lubricant solution; and after dissolving the cross-linked lubricant in the solvent, forming a lubricant layer over a magnetic medium by applying the lubricant solution to the magnetic medium and subsequently evaporating the solvent.

3. The method of claim 2, wherein the physical treatment comprises a treatment selected from heating the solvent free combination, increasing pressure on the solvent free combination, changing the pH for the solvent free combination, irradiating the solvent free combination, and adding a catalyst to the solvent free combination.

4. The method of claim 3, wherein irradiating the solvent free combination comprises exposing the solvent free combination to a radiation source selected from an electron beam, gamma-radiation, and an ultraviolet light source.

5. The method of claim 2, wherein the physical treatment comprises exposing the solvent free combination to an ultraviolet light source, wherein the ultraviolet light source has a wavelength selected from 185 nm and 172 nm.

6. The method of claim 5, further comprising adjusting a distance between the ultraviolet light source and the solvent free combination to optimize cross-linking between the backbone sections.

7. The method of claim 2, further comprising controlling an extent of cross-linking between the backbone sections by monitoring an increase in viscosity of the solvent free combination.

8. The method of claim 7, wherein the solvent free combination is treated with the physical treatment to increase the viscosity of the solvent free combination by at least about thirty-five percent.

9. A method for forming a lubricant film for magnetic recording applications, the method comprising:

combining cyclic phosphazene molecules with first PFPE molecules to form a first solvent free combination;

treating the first solvent free combination with a physical treatment to cross-link the cyclic phosphazene molecules with the first PFPE molecules to form hybrid lubricant molecules;

combining the hybrid lubricant molecules with second PFPE molecules to form a second solvent free combination, each first PFPE molecule of the hybrid lubricant molecules and each second PFPE molecule comprising a backbone section and at least one functional end group;

treating the second solvent free combination with a physical treatment to cross-link the backbone section of the first PFPE molecules of the hybrid lubricant molecules with the backbone section of the second PFPE molecules to create a cross-linked lubricant comprising twice-cross-linked lubricant molecules, wherein each twice-cross-linked lubricant molecule has more end functional groups than each first PFPE molecule, each hybrid lubricant molecule, and each second PFPE molecule, taken individually;

dissolving the cross-linked lubricant in a solvent to form a lubricant solution; and after dissolving the cross-linked lubricant in the solvent, forming a lubricant layer over a magnetic medium by applying the lubricant solution to the magnetic medium and subsequently evaporating the solvent.

* * * * *

UNITED STATES PATENT AND TRADEMARK OFFICE
CERTIFICATE OF CORRECTION

| | | |
|---|---|---|
| PATENT NO. | : 9,090,717 B2 | Page 1 of 1 |
| APPLICATION NO. | : 13/330339 | |
| DATED | : July 28, 2015 | |
| INVENTOR(S) | : Xing-Cai Guo | |

It is certified that error appears in the above-identified patent and that said Letters Patent is hereby corrected as shown below:

In the Specification

Column 4, Line 11
   "at least on enhanced"---should read "at least one enhanced"

Column 4, Line 57
   "in hard disk drive"---should read "in a hard disk drive"

Column 5, Line 6
   "Z-DOL molecules"---should read "Z-DOL molecule"

Column 14, Line 30
   "in a neat sate."---should read "in a neat state."

Column 16, Line 62-63
   "when the subjected to"---should read "when subjected to"

Signed and Sealed this
Twenty-ninth Day of December, 2015

Michelle K. Lee
*Director of the United States Patent and Trademark Office*